US009650940B2

(12) United States Patent
Kakehashi et al.

(10) Patent No.: US 9,650,940 B2
(45) Date of Patent: May 16, 2017

(54) THERMAL MANAGEMENT SYSTEM FOR VEHICLES

(71) Applicant: DENSO CORPORATION, Kariya, Aichi-pref. (JP)

(72) Inventors: Nobuharu Kakehashi, Toyoake (JP); Yoshiki Katoh, Kariya (JP); Norihiko Enomoto, Nagoya (JP); Michio Nishikawa, Nagoya (JP); Kengo Sugimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 46 days.

(21) Appl. No.: 14/777,538

(22) PCT Filed: Mar. 17, 2014

(86) PCT No.: PCT/JP2014/001484
§ 371 (c)(1),
(2) Date: Sep. 16, 2015

(87) PCT Pub. No.: WO2014/148024
PCT Pub. Date: Sep. 25, 2014

(65) Prior Publication Data
US 2016/0153343 A1 Jun. 2, 2016

(30) Foreign Application Priority Data

Mar. 19, 2013 (JP) .................................. 2013-056099

(51) Int. Cl.
*F01P 1/06* (2006.01)
*F01P 3/20* (2006.01)
(Continued)

(52) U.S. Cl.
CPC ............ *F01P 3/20* (2013.01); *B60H 1/00885* (2013.01); *B60H 1/22* (2013.01); *B60K 6/22* (2013.01);
(Continued)

(58) Field of Classification Search
CPC .... F01P 3/20; F01P 2060/045; F01P 2060/08; B60K 6/22; B60K 11/02; B60H 1/22; B60H 1/00885; B60W 10/30; B60W 20/00
See application file for complete search history.

(56) References Cited

U.S. PATENT DOCUMENTS

| 5,497,941 A * | 3/1996 | Numazawa ............ B60H 1/004 |
| | | 165/43 |
| 6,357,541 B1 * | 3/2002 | Matsuda .................. B60K 6/22 |
| | | 165/43 |

(Continued)

FOREIGN PATENT DOCUMENTS

| CN | 102062200 A | 5/2011 |
| CN | 102897019 A | 1/2013 |

(Continued)

OTHER PUBLICATIONS

U.S. Appl. No. 14/408,854, filed Dec. 17, 2014, Enomoto et al.
(Continued)

*Primary Examiner* — Hung Q Nguyen
(74) *Attorney, Agent, or Firm* — Harness, Dickey & Pierce, P.L.C.

(57) ABSTRACT

A vehicle thermal management system includes a heat medium-heat medium heat exchanger that exchanges heat between a first heat medium drawn into and discharged from a first pump and a second pump, and a second heat medium circulating through an engine cooling circuit. A first switching valve switches between a state in which the first heat
(Continued)

medium discharged from the first pump flows, and another state in which the first heat medium discharged from the second pump flows, with respect to the plurality of devices and the heat medium-heat medium heat exchanger. The second switching valve switches between a state in which the first heat medium flows into the first pump, and another state in which the first heat medium flows into the second pump, with respect to the plurality of devices and the heat medium-heat medium heat exchanger.

10 Claims, 16 Drawing Sheets

(51) Int. Cl.
  *B60H 1/00* (2006.01)
  *B60K 6/22* (2007.10)
  *B60K 11/02* (2006.01)
  *B60H 1/22* (2006.01)
  *B60W 10/30* (2006.01)
  *B60W 20/00* (2016.01)

(52) U.S. Cl.
  CPC ............ *B60K 11/02* (2013.01); *B60W 10/30* (2013.01); *B60W 20/00* (2013.01); *F01P 2060/045* (2013.01); *F01P 2060/08* (2013.01)

(56) References Cited

U.S. PATENT DOCUMENTS

| | | | | |
|---|---|---|---|---|
| 7,287,581 | B2* | 10/2007 | Ziehr | B60H 1/00392 165/202 |
| 8,517,087 | B2* | 8/2013 | Zeigler | B60H 1/00907 165/202 |
| 2011/0111920 | A1 | 5/2011 | Gooden et al. | |
| 2012/0168140 | A1 | 7/2012 | Yokkoyama et al. | |
| 2013/0030622 | A1 | 1/2013 | Park et al. | |
| 2014/0374081 | A1 | 12/2014 | Kakehashi et al. | |
| 2015/0000327 | A1 | 1/2015 | Kakehashi et al. | |
| 2015/0273976 | A1 | 10/2015 | Enomoto et al. | |

FOREIGN PATENT DOCUMENTS

| | | |
|---|---|---|
| JP | H05032031 U | 4/1993 |
| JP | 2000274240 A | 10/2000 |
| JP | 2011121551 A | 6/2011 |
| JP | 2011130642 A | 6/2011 |
| JP | 2013230805 A | 11/2013 |
| WO | WO-2013190767 A1 | 12/2013 |

OTHER PUBLICATIONS

International Search Report and Written Opinion (in Japanese with English Translation) for PCT/JP2014/001484, mailed Jun. 17, 2014; ISA/JP.

* cited by examiner

THERMAL MANAGEMENT SYSTEM FOR VEHICLES

CROSS REFERENCE TO RELATED APPLICATIONS

This application is a U.S. National Phase Application under 35 U.S.C. 371 of International Application No. PCT/JP2014/001484 filed on Mar. 17, 2014 and published in Japanese as WO 2014/148024 A1 on Sep. 25, 2014. This application is based on and claims the benefit of priority from Japanese Patent Application 2013-056099 filed on Mar. 19, 2013. The entire disclosures of all of the above applications are incorporated herein by reference.

FIELD OF THE INVENTION

The preset disclosure relates to a thermal management system for a vehicle.

BACKGROUND ART

Conventionally, for example, as disclosed in Patent Document 1, a heat controller has been proposed which cools a motor generator, an inverter, a battery, and a vehicle compartment of an electric vehicle.

The heat controller in the related art includes a cooling circuit that allows for circulation of a coolant for cooling the motor generator and the inverter, a first circulation circuit that allows for circulation of a coolant for cooling the battery and the vehicle compartment, and a second circulation circuit that allows for circulation of a coolant passing through an exterior heat exchanger and exchanging heat with outside air.

Further, the heat controller includes a first valve that connects and disconnects between the cooling circuit and the first circulation circuit, a second valve that connects the cooling circuit to either the first circulation circuit or the second circulation circuit, and a third valve that connects and disconnects between the cooling circuit and the second circulation circuit. The respective valves are controlled to switch the subject of connection of the cooling circuit between the first circulation circuit and the second circulation circuit.

Heat can be transferred by a heat transfer device between the coolant circulating through the first circulation circuit and the coolant circulating through the second circulation circuit. The heat transfer device transfers the heat from the coolant having a low temperature to the coolant having a high temperature, between the coolants in the first and second circulation circuits.

The heat of the coolant in the first circulation circuit is transferred to the coolant in the second circulation circuit by the heat transfer device, and the heat of the coolant in the second circulation circuit is dissipated into the outside air by the exterior heat exchanger, which can cool the battery and the vehicle compartment.

The cooling circuit is connected to the first circulation circuit or the second circulation circuit by use of the first to third valves, so that the heat of the coolant in the cooling circuit can be dissipated into the outside air by the exterior heat exchanger in the second circulation circuit, thereby cooling the motor generator and the inverter.

RELATED ART DOCUMENT

Patent Document

[Patent Document 1] Japanese Unexamined Patent Application Publication No. 2011-121551

SUMMARY OF THE INVENTION

The inventors of the present application have found through their studies that the related-art cooling system, which is designed to cool a plurality of devices, including a motor generator, an inverter, and a battery, advantageously needs only one exterior heat exchanger. However, the cooling system might lead to a more complicated circuit configuration as a whole. In particular, as the number of devices increases, the entire circuit configuration tends to be more complicated.

The devices that require cooling include, for example, an EGR cooler and an intake air cooler, in addition to the motor generator, the inverter, and the battery. Those devices have different required cooling temperatures.

To appropriately cool the respective devices, the coolant to circulate through the respective devices is proposed to be switchable among the devices, which leads to an increase in the number of circulation circuits according to the number of devices. Together with the increase, the number of valves that connect and disconnect between the cooling circuit and the respective circulation circuits is also increased, which results in a very complicated structure for a flow path that connects each circulation circuit to the cooling circuit.

For this reason, the inventors of the present application have already proposed a simplified structure of a vehicle thermal management system that can switch a heat medium among the devices, through which the heat medium circulates, in Japanese Unexamined Patent Application Publication No. 2012-278552 (hereinafter referred to as a previous application example).

As described in the previous application example, the devices are connected in parallel between first and second switching valves that are designed to switch the flow of heat media. With such a simple structure, the heat media circulating through the devices can be switched among the devices.

However, in application to vehicles with engines (internal combustion engines), the previous application example does not consider the cooperation with an engine cooling circuit through which an engine coolant passes. Thus, the application example cannot efficiently use heat within the vehicle by exchanging the heat between the engine and the devices connected between the first and second switching valves.

For example, the devices cannot be heated with waste heat from the engine. Neither can the engine be warmed up with waste heat from the devices.

The present disclosure has been made in view of the foregoing matters and it is an object of the present disclosure to provide a thermal management system for a vehicle, which can exchange heat between a plurality of devices and an engine, while switching a heat medium circulating through a plurality of devices.

In order to achieve the foregoing object, a thermal management system for a vehicle according to the present disclosure includes a first pump, a second pump, a heat medium-outside air heat exchanger, a plurality of devices, an engine cooling circuit, an engine pump, a heat medium-heat medium heat exchanger, a first switching valve, and a second switching valve.

The first pump and the second pump are adapted to draw and discharge a first heat medium. The heat medium-outside air heat exchanger exchanges heat between outside air and the first heat medium discharged from the first pump or the second pump. The first heat medium circulates through the plurality of devices. The engine cooling circuit allows a second heat medium to circulate through an engine, the engine pump adapted to draw and discharge the second heat medium. The heat medium-heat medium heat exchanger exchanges heat between the first heat medium and the second heat medium. The first switching valve is adapted to switch a flow of the first heat medium, and disposed in a flow path in which a heat medium discharge side of the first pump and a heat medium discharge side of the second pump are connected in parallel with each other, and the plurality of devices and the heat medium-heat medium heat exchanger are connected in parallel with each other. Furthermore, the second switching valve is adapted to switch a flow of the first heat medium, and is disposed in another flow path in which a heat medium suction side of the first pump and a heat medium suction side of the second pump are connected in parallel with each other, and the plurality of devices and the heat medium-heat medium heat exchanger are connected in parallel with each other.

The first switching valve switches between a state in which the first heat medium discharged from the first pump flows, and another state in which the first heat medium discharged from the second pump flows, with respect to the plurality of devices and the heat medium-heat medium heat exchanger.

The second switching valve switches between a state in which the first heat medium flows into the first pump, and another state in which the first heat medium flows into the second pump, with respect to the plurality of devices and the heat medium-heat medium heat exchanger.

In this way, the first pump and the second pump are connected in parallel with the first switching valve and the second switching valve. Furthermore, the plurality of devices is connected in parallel between the first and second switching valves, and the first and second switching valves are adapted to switch the flow of the first heat medium for the plurality of devices. Thus, the plurality of devices can be switched between the circulation of the heat medium on a first pump side and the circulation of the heat medium on a second pump side.

Further, because the heat medium-heat medium heat exchanger is provided for exchanging heat between the first heat medium and the second heat medium of the engine cooling circuit, the heat can be exchanged between the plurality of devices and the engine via the heat medium-heat medium heat exchanger.

DESCRIPTION OF EMBODIMENTS

Figure 1:
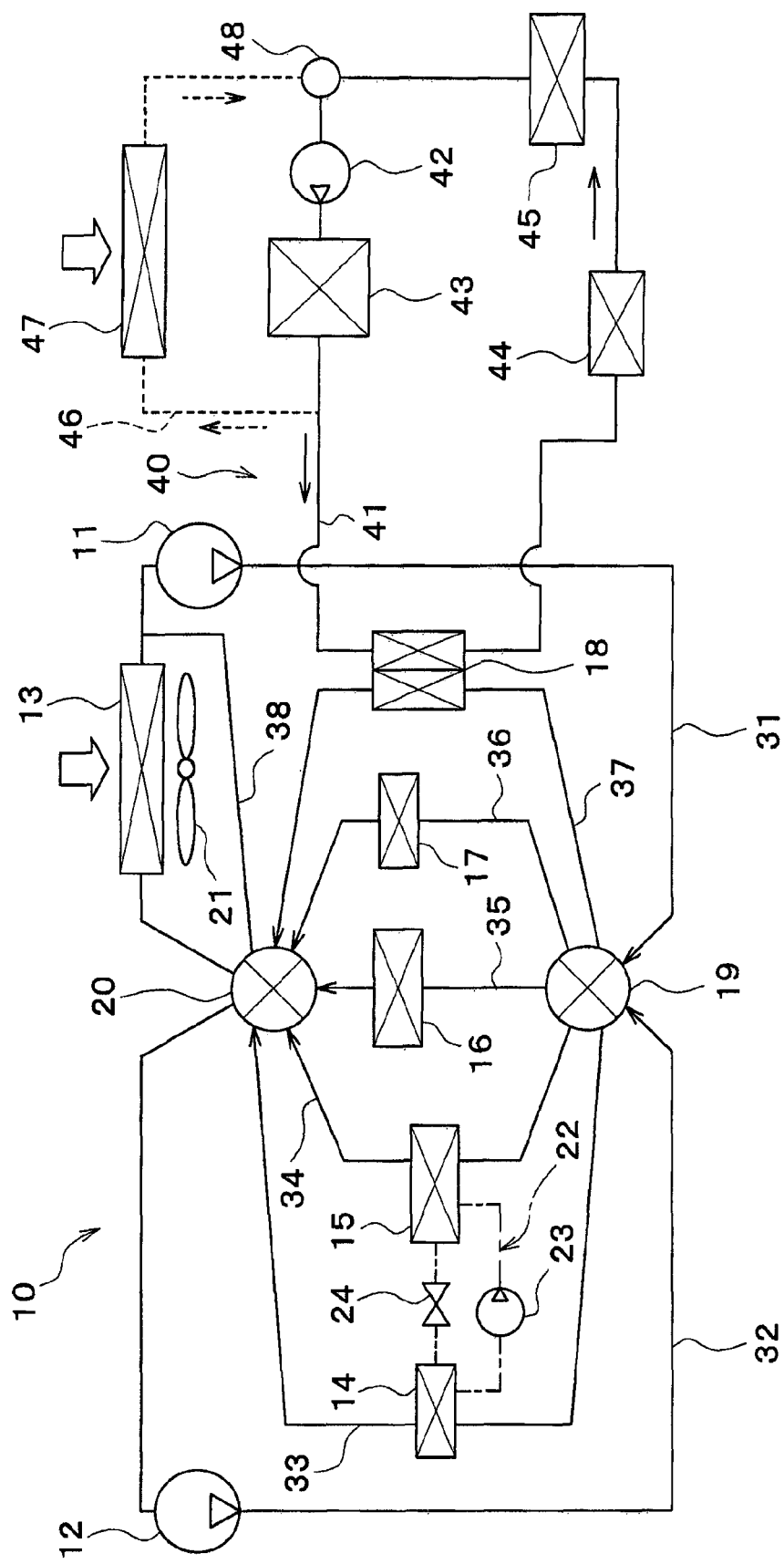
FIG. 1 is an entire configuration diagram of a vehicle thermal management system according to a first embodiment.

In the following, preferred embodiments of the present disclosure will be described with reference to the accompanying drawings. The same or equivalent parts in the embodiments below are indicated by the same reference characters throughout the figures.

(First Embodiment)

In the following, a first embodiment of the present disclosure will be described based on FIGS. 1 to 9. A vehicle thermal management system 10 shown in FIG. 1 is used to adjust the temperature of various devices mounted on a vehicle or an interior of the vehicle to an appropriate level.

In this embodiment, the thermal management system 10 is applied to a hybrid vehicle that can obtain the driving force for traveling from both an engine (internal combustion engine) and an electric motor for traveling.

The hybrid vehicle of this embodiment is configured as a plug-in hybrid vehicle that can charge the battery (vehicle-mounted battery) mounted on the vehicle, with power supplied from an external power source (commercial power source) during stopping of the vehicle. For example, a lithium ion battery can be used as the battery.

A driving force output from an engine is used not only for traveling of the vehicle, but also for operating a generator. Power generated by the generator and power supplied from the external power source can be stored in the battery. The power stored in the battery can be supplied not only to the electric motor for traveling, but also to various vehicle-mounted devices, such as electric components included in a cooling system.

As shown in FIG. 1, the thermal management system 10 includes a first pump 11, a second pump 12, a radiator 13, a coolant cooler 14, a coolant heater 15, an intake air cooler 16, a cooler core 17, a coolant-coolant heat exchanger 18, a first switching valve 19, and a second switching valve 20.

The first pump 11 and the second pump 12 are electric pumps designed to draw and discharge a coolant (first heat medium). The coolant is a fluid as the heat medium. In this embodiment, a liquid containing at least ethylene glycol, dimethylpolysiloxane, or a nano-fluid is used as the coolant.

The radiator 13 is a radiator (heat-medium outside-air heat exchanger) that dissipates heat of the coolant into outside air by exchanging heat between the coolant and the outside air. The coolant outlet side of the radiator 13 is connected to the coolant suction side of the first pump 11. An exterior blower 21 is an electric blower for blowing the outside air to the radiator 13. The radiator 13 and the exterior blower 21 are disposed at the forefront of the vehicle. Thus, during traveling of the vehicle, the radiator 13 can face the traveling air.

The coolant cooler 14 is a low-pressure side heat exchanger (heat medium cooler) that cools the coolant by exchanging heat between the coolant and a low-pressure refrigerant of a refrigeration cycle 22. The coolant inlet side of the coolant cooler 14 is connected to the coolant discharge side of the second pump 12.

The coolant cooler 14 serves as an evaporator of the refrigeration cycle 22. The coolant heater 15 serves as a condenser of the refrigeration cycle 22.

The refrigeration cycle 22 is an evaporation compression refrigerator which includes a compressor 23, the coolant heater 15 as the condenser, an expansion valve 24, and the coolant cooler 14 as the evaporator. The refrigeration cycle 22 of this embodiment employs a fluorocarbon refrigerant as the refrigerant, and forms a subcritical refrigeration cycle whose high-pressure side refrigerant pressure does not exceed the critical pressure of the refrigerant.

The compressor 23 is an electric compressor driven by power supplied from the battery. The compressor 23 draws and compresses the refrigerant in the refrigeration cycle 22 to discharge the compressed refrigerant therefrom. The coolant heater 15 is a high-pressure side heat exchanger (heat medium heater) that condenses a high-pressure side refrigerant by exchanging heat between the high-pressure side refrigerant discharged from the compressor 23 and the coolant.

The expansion valve 24 is decompression means for decompressing and expanding a liquid-phase refrigerant condensed by the coolant heater 15. The coolant cooler 14 is a low-pressure side heat exchanger that evaporates a low-pressure refrigerant by exchanging heat between the coolant and the low-pressure refrigerant decompressed and expanded by the expansion valve 24. The gas-phase refrigerant evaporated at the coolant cooler 14 is drawn into and compressed by the compressor 23.

The radiator 13 serves to cool the coolant by the outside air, while the coolant cooler 14 serves to cool the coolant by the low-pressure refrigerant of the refrigeration cycle 22. Thus, the temperature of the coolant cooled by the coolant cooler 14 is lower than that of the coolant cooled by the radiator 13.

Specifically, the radiator 13 cannot cool the coolant to a temperature lower than that of the outside air, whereas the coolant cooler 14 can cool the coolant to a temperature lower than that of the outside air.

Hereinafter, the coolant cooled by the outside air in the radiator 13 is referred to as an "intermediate-temperature coolant", and the coolant cooled by the low-pressure refrigerant of the refrigeration cycle 22 in the coolant cooler 14 is referred to as a "low-temperature coolant".

The intake air cooler 16 is a heat exchanger that cools intake air by exchanging heat between the coolant and the intake air at a high temperature compressed by a supercharger for an engine. The intake air is preferably cooled down to about 30° C.

The cooler core 17 is a cooling heat exchanger that cools air to be blown into the vehicle interior, by exchanging heat between the coolant and the air into the vehicle interior.

The intake air cooler 16, the cooler core 17, and the coolant-coolant heat exchanger 18 are temperature adjustment target devices (devices to be cooled/devices to be heated) whose temperature is adjusted (cooled/heated) by either an intermediate-temperature coolant or a low-temperature coolant.

The first pump 11 is disposed in a first-pump flow path 31. The radiator 13 is disposed on a suction side of the first pump 11 in the first-pump flow path 31. The second pump 12 is disposed in a second-pump flow path 32.

The coolant cooler 14 is disposed in a coolant-heater flow path 33. The coolant heater 15 is disposed in a coolant-heater flow path 34. The intake air cooler 16 is disposed in an intake-air cooler flow path 35. The cooler core 17 is disposed in a cooler-core flow path 36. The coolant-coolant heat exchanger 18 is disposed in a coolant-coolant heat exchanger flow path 37.

The first-pump flow path 31, the second-pump flow path 32, the coolant-cooler flow path 33, the coolant-heater flow path 34, the intake-air cooler flow path 35, the cooler-core flow path 36, and the coolant-coolant heat exchanger flow path 37 are connected to the first switching valve 19 and the second switching valve 20.

Each of the first and second switching valves 19 and 20 is a flow switching portion that switches the flow of coolant.

The first switching valve 19 includes two inlets for the coolant, and five outlets for the coolant. The second switching valve 20 includes three outlets for the coolant, and five inlets for the coolant.

A first inlet of the first switching valve 19 is connected to one end of the first-pump flow path 31. In other words, the first inlet of the first switching valve 19 is connected to the coolant discharge side of the first pump 11.

A second inlet of the first switching valve 19 is connected to one end of the second-pump flow path 32. In other words, the second inlet of the first switching valve 19 is connected to the coolant discharge side of the second pump 12.

A first outlet of the first switching valve 19 is connected to one end of the coolant-cooler flow path 33. In other words, the first outlet of the first switching valve 19 is connected to the coolant inlet side of the coolant cooler 14.

A second outlet of the first switching valve 19 is connected to one end of the coolant-heater flow path 34. In other words, the second outlet of the first switching valve 19 is connected to the coolant inlet side of the coolant heater 15.

A third outlet of the first switching valve 19 is connected to one end of the intake-air cooler flow path 35. In other words, the third outlet of the first switching valve 19 is connected to the coolant inlet side of the intake air cooler 16.

A fourth outlet of the first switching valve 19 is connected to one end of the cooler-core flow path 36. In other words, the fourth outlet of the first switching valve 19 is connected to the coolant inlet side of the cooler core 17.

A fifth outlet of the first switching valve 19 is connected to one end of the coolant-coolant heat exchanger flow path 37. In other words, the fifth outlet of the first switching valve 19 is connected to the coolant inlet side of the coolant-coolant heat exchanger 18.

A first outlet of the second switching valve 20 is connected to the other end of the first-pump flow path 31. In other words, the first outlet of the second switching valve 20 is connected to the coolant inlet side of the radiator 13.

A second outlet of the second switching valve 20 is connected to the other end of the second-pump flow path 32. In other words, the second outlet of the second switching valve 20 is connected to the coolant suction side of the second pump 12.

A third outlet of the second switching valve 20 is connected to one end of a bypass flow path 38. The bypass flow path 38 is a flow path for allowing the coolant to flow bypassing the radiator 13. The other end of the bypass flow path 38 is connected to a part between the radiator 13 and the first pump 11 in the first-pump flow path 31.

A first inlet of the second switching valve 20 is connected to the other end of the coolant-cooler flow path 33. In other words, the first inlet of the second switching valve 20 is connected to the coolant outlet side of the coolant cooler 14.

A second inlet of the second switching valve 20 is connected to the other end of the coolant-heater flow path 34. In other words, the second inlet of the second switching valve 20 is connected to the coolant outlet side of the coolant heater 15.

A third inlet of the second switching valve 20 is connected to the other end of the intake-air cooler flow path 35. In other words, the third inlet of the second switching valve 20 is connected to the coolant outlet side of the intake air cooler 16.

A fourth inlet of the second switching valve 20 is connected to the other end of the cooler-core flow path 36. In other words, the fourth inlet of the second switching valve 20 is connected to the coolant outlet side of the cooler core 17.

A fifth inlet of the second switching valve 20 is connected to the other end of the coolant-coolant heat exchanger flow path 37. In other words, the fifth inlet of the second switching valve 20 is connected to the coolant outlet side of the coolant-coolant heat exchanger 18.

The first switching valve 19 can be configured to arbitrarily or selectively switch the communication states between the two inlets and the five outlets. The second switching valve 20 can be configured to arbitrarily or selectively switch the communication states between the three outlets and the five inlets.

Examples of the structures of the first and second switching valves 19 and 20 will be briefly described below. Each of the first and second switching valves 19 and 20 includes a case forming an outer envelope, and a valve body accommodated in the case. The inlet and outlet for the coolant are formed in predetermined positions of the case, and the valve body is rotated, thereby changing the communication state between the inlet and outlet for the coolant.

The valve body of the first switching valve 19 and the valve body of the second switching valve 20 are rotated in cooperation with a common electric motor. Alternatively, the valve body of the first switching valve 19 and the valve body of the second switching valve 20 may independently rotate by another electric motor.

The thermal management system 10 includes an engine cooling circuit 40. The engine cooling circuit 40 includes a circulation flow path 41 that allows the engine coolant (second heat medium) to circulate therethrough. The circulation flow path 41 configures a main flow path of the engine cooling circuit 40. In this embodiment, a liquid containing at least ethylene glycol, dimethylpolysiloxane, or a nano-fluid is used as the engine coolant.

In the circulation flow path 41, an engine pump 42, an engine 43, the coolant-coolant heat exchanger 18, a heater core 44, and a CVT warmer 45 are arranged in this order in series.

The engine pump 42 is an electric pump for sucking and discharging the engine coolant. The coolant-coolant heat exchanger 18 is a heat exchanger (heat medium-heat medium heat exchanger) that exchanges heat between the engine coolant circulating through the engine cooling circuit 40, and the coolant circulating by the first pump 11 or second pump 12.

The heater core 44 is a heating heat exchanger that heats air to be blown into the vehicle interior, by exchanging heat between the coolant and the air into the vehicle interior.

The CVT warmer 45 is a heat exchanger for heating a CVT oil (lubricating oil) by exchanging heat between the CVT oil for use in a CVT (continuously variable transmission) and the coolant.

A part of the circulation flow path 41 on the coolant outlet side of the engine 43 is connected to one end of an engine radiator flow path 46. The other end of the engine radiator flow path 46 is connected to a part on a suction side of the engine pump 42 in the circulation flow path 41.

The engine radiator flow path 46 is provided with an engine radiator 47. The engine radiator 47 is an engine heat dissipation device (engine heat-medium outside-air heat exchanger) that exchanges heat between the coolant and air outside the vehicle compartment (hereinafter referred to as an "outside air") to dissipate the heat of the coolant into the outside air.

The outside air is blown to the engine radiator 47 by an exterior blower 21. Although omitted in the figure, the engine radiator 47 is disposed on the downstream side of the radiator 13 in the outside air flow direction at the forefront part of the vehicle.

A thermostat 48 is disposed in a connection portion between the other end of the engine radiator flow path 46 and the circulation flow path 41. The thermostat 48 is a coolant-temperature responsive valve constructed of a mechanical mechanism that is designed to open and close a coolant flow path by displacing a valve body using a thermo wax (temperature sensing member) whose volume changes in response to the temperature.

Specifically, when the temperature of coolant is below a predetermined temperature (for example, of less than 80° C.), the thermostat 48 closes the engine radiator flow path 46. When the temperature of coolant is above the predetermined temperature (for example, 80° C. or higher), the thermostat 48 opens the engine radiator flow path 46.

Figure 2:
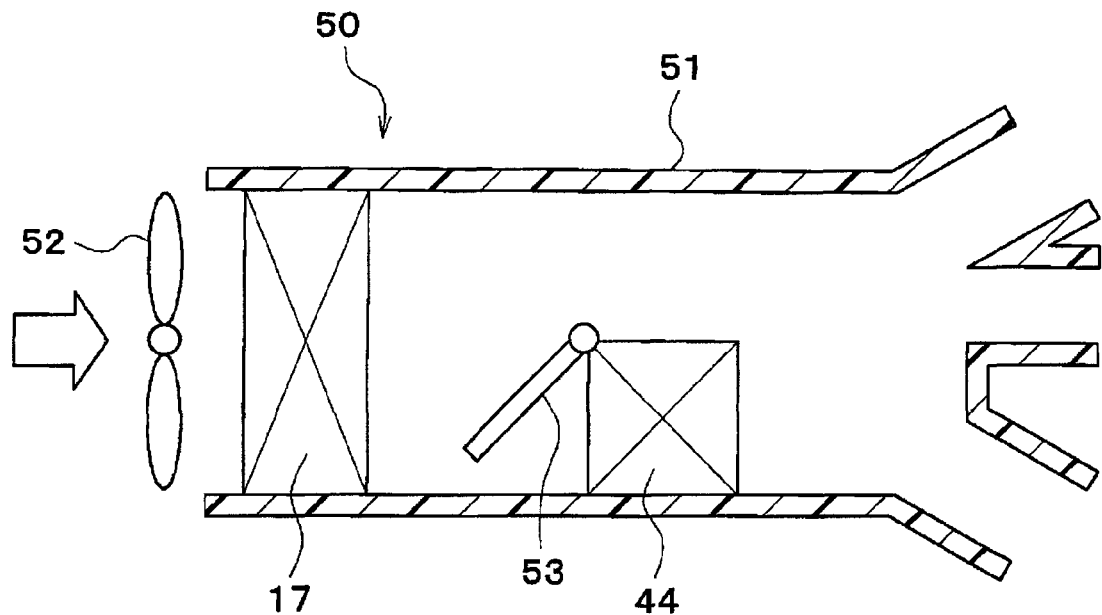
FIG. 2 is a cross-sectional diagram of an interior air conditioning unit in the first embodiment.

As shown in FIG. 2, the cooler core 17 and the heater core 44 are accommodated in a casing 51 of an interior air conditioning unit 50. An interior blower 52 is an electric blower for blowing the inside air or outside air to the cooler core 17 and the heater core 44.

The heater core 44 is disposed on the downstream side of the air flow of the cooler core 17 within the casing 51. An air mix door 53 is disposed in between the cooler core 17 and the heater core 44 within the casing 51.

The air mix door 53 serves as an air volume ratio adjuster that adjusts a ratio of the volume of the air passing through the heater core 44 to that of the air bypassing the heater core 44.

Figure 3:
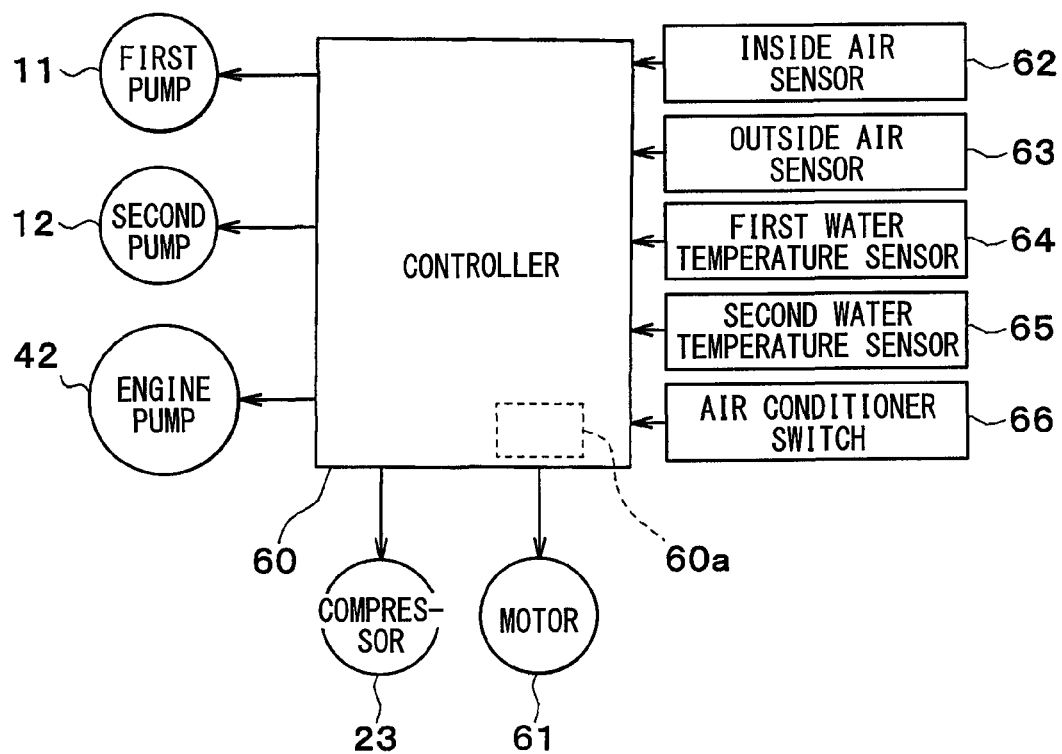
FIG. 3 is a block diagram showing an electric controller of the vehicle thermal management system in the first embodiment.

Now, an electric controller of the thermal management system 10 will be described with reference to FIG. 3. A controller 60 is comprised of a known microcomputer, including CPU, ROM, RAM, etc., and a peripheral circuit thereof. The controller performs various kinds of computations and processing based on air conditioning control programs stored in the ROM. The controller 60 serves as a control unit that controls the operation of the first pump 11, the second pump 12, the compressor 23, the engine pump 42, a switching-valve electric motor 61, and the like, connected to the output side thereof.

The switching-valve electric motor 61 is a switching valve driving portion that drives the valve body of the first switching valve 19 and the valve body of the second switching valve 20.

The controller 60 has a control unit integrally configured with various types of devices to be controlled, connected to the output side thereof. The structure (hardware and software) for controlling the operation of each of the devices to be controlled configures the control unit for controlling the operation of the corresponding device to be controlled.

In this embodiment, particularly, the structure (hardware and software) that controls the operation of the switching-valve electric motor 61 acts as a switching valve controller 60a. The switching valve controller 60a may be provided independently of the controller 60.

Detection signals from a group of sensors, including an inside air sensor 62, an outside air sensor 63, a first water temperature sensor 64, a second water temperature sensor 65, and the like are input to the input side of the controller 60.

The inside air sensor 62 is a detector (inside air temperature detector) that detects the temperature of inside air (the temperature of the vehicle interior). An outside air sensor 63 is a detector (outside air temperature detector) that detects the temperature of outside air. A first water temperature sensor 64 is a detector (first heat medium temperature detector) that detects the temperature of coolant immediately after it passes through the radiator 13.

The second water temperature sensor 65 is a detector (second heat medium temperature detector) that detects the temperature of engine coolant in the engine cooling circuit 40. For example, the second water temperature sensor 65 detects the temperature of the engine coolant immediately after it passes through the engine 43.

An operation signal is input from an air conditioner switch 66 to the input side of the controller 60. The air conditioner switch 66 is a switch designed to switch an air conditioner between on and off (in short, on and off of cooling), and disposed near a dash board in the vehicle compartment.

Now, the operation of the above-mentioned structure will be described. The controller 60 controls the operations of the first pump 11, the second pump 12, the compressor 23, the engine pump 42, the switching-valve electric motor 61, and the like, thereby switching among various operation modes. Various operation modes include, for example, a first mode shown in FIG. 4, a second mode shown in FIG. 5, a third mode shown in FIG. 6, and a fourth mode shown in FIG. 7, to which the controller performs switching.

Figure 4:
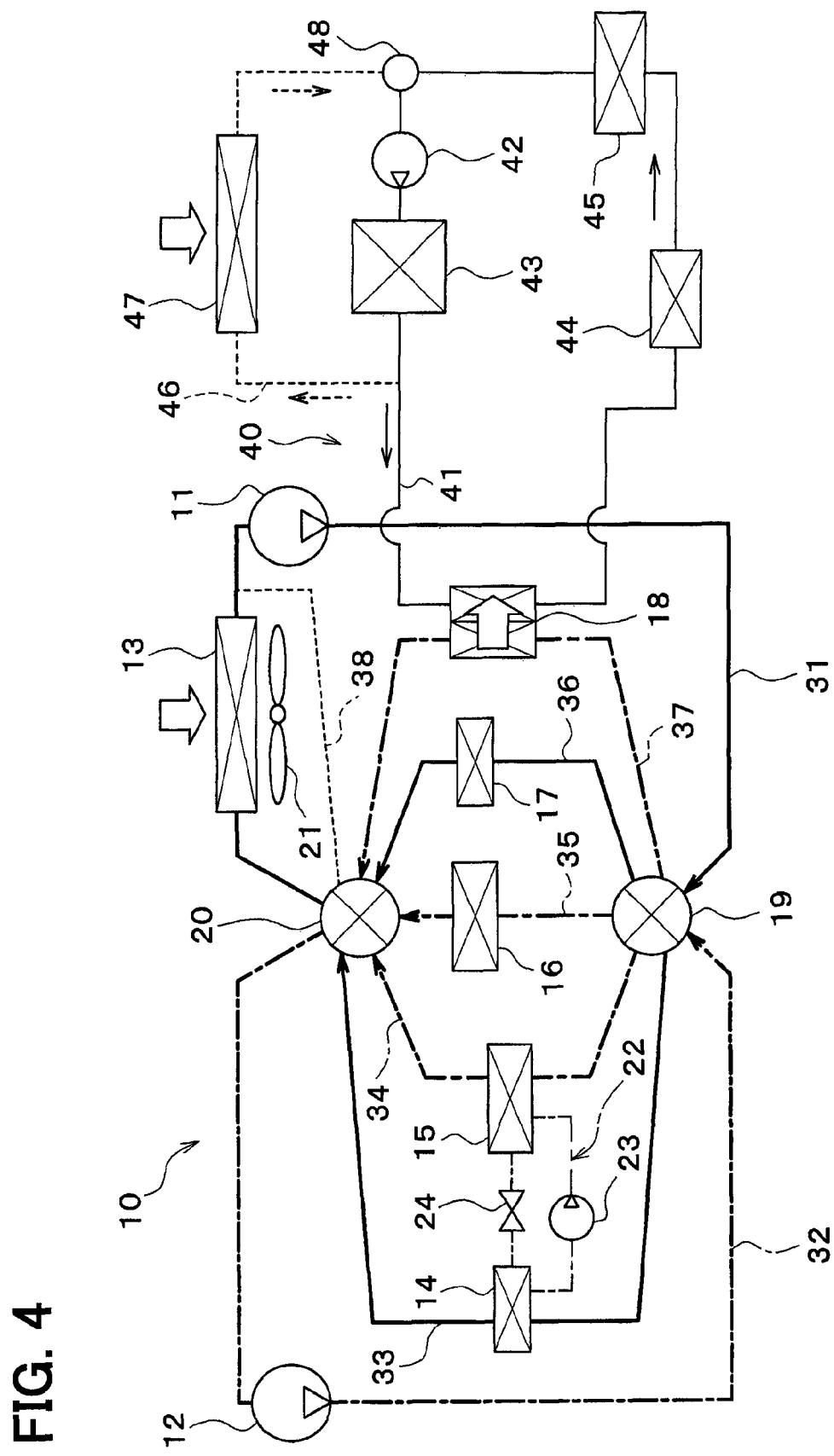
FIG. 4 is a diagram for explaining a first mode of the vehicle thermal management system in the first embodiment.

FIG. 4 shows the operation of the thermal management system 10 performed when the first and second switching valves 19 and 20 are switched to a first mode. The first mode is performed mainly in winter so as to warm up the engine 43. For example, the first mode is performed when the temperature of the engine coolant is determined to be less than the predetermined temperature.

In the first mode, the first switching valve 19 and the second switching valve 20 connect the first-pump flow path 31 to the coolant-cooler flow path 33 and the cooler-core flow path 36, and also connect the second-pump flow path 32 to the coolant-heater flow path 34, the intake-air cooler flow path 35, and the coolant-coolant heat exchanger flow path 37.

Accordingly, the first pump 11, the coolant cooler 14, the cooler core 17, and the radiator 13 constitute a first coolant circuit (low-temperature coolant circuit), while the second pump 12, the coolant heater 15, the intake air cooler 16, and the coolant-coolant heat exchanger 18 constitute a second coolant circuit (intermediate-temperature coolant circuit).

In the first coolant circuit, as indicated by thick alternate long and short dashed arrows of FIG. 4, the coolant discharged from the first pump 11 flows through the coolant cooler 14 and the cooler core 17 in parallel, and then through the radiator 13 to be drawn into the first pump 11.

In the second coolant circuit, as indicated by a thick solid arrow of FIG. 4, the coolant discharged from the second pump 12 flows through the coolant heater 15, the intake air cooler 16, and the coolant-coolant heat exchanger 18 in parallel to be drawn into the second pump 12.

In the first coolant circuit, the low-temperature coolant cooled by the coolant cooler 14 flows through the radiator 13, allowing the coolant to absorb heat from the outside air in the radiator 13. Then, the coolant absorbing heat from the outside air in the radiator 13 exchanges heat with the refrigerant in the refrigeration cycle 22 at the coolant cooler 14 to dissipate heat therefrom. Thus, in the coolant cooler 14, the refrigerant in the refrigeration cycle 22 absorbs heat from the outside air via the coolant.

The refrigerant absorbing heat from the outside air in the coolant cooler 14 exchanges heat with the coolant in the second coolant circuit at the coolant heater 15, whereby the coolant in the second coolant circuit is heated. That is, the heat pump operation of pumping up the heat of outside air to the coolant in the second coolant circuit can be achieved.

The coolant heated by the coolant heater 15 exchanges heat with the engine coolant in the engine cooling circuit 40 when flowing through the coolant-coolant heat exchanger 18 to dissipate heat therefrom. Thus, in the coolant-coolant heat exchanger 18, the engine coolant of the engine cooling circuit 40 can be heated.

Accordingly, in the engine cooling circuit 40, the heater core 44 can heat air to be blown into the vehicle interior, thereby performing air heating of the vehicle interior, and the CVT warmer 45 can warm the CVT oil, thereby warming up the engine 43.

For example, when the outside air temperature is 0° C., the coolant temperature in the first coolant circuit is at about −10° C., the coolant temperature in the second coolant circuit is at about 50° C., and the temperature of the engine coolant in the engine cooling circuit 40 is at about 40° C. In this case, the thermostat 48 closes the engine radiator flow path 46, whereby the engine coolant in the engine cooling circuit 40 does not flow through the engine radiator 47.

Figure 5:
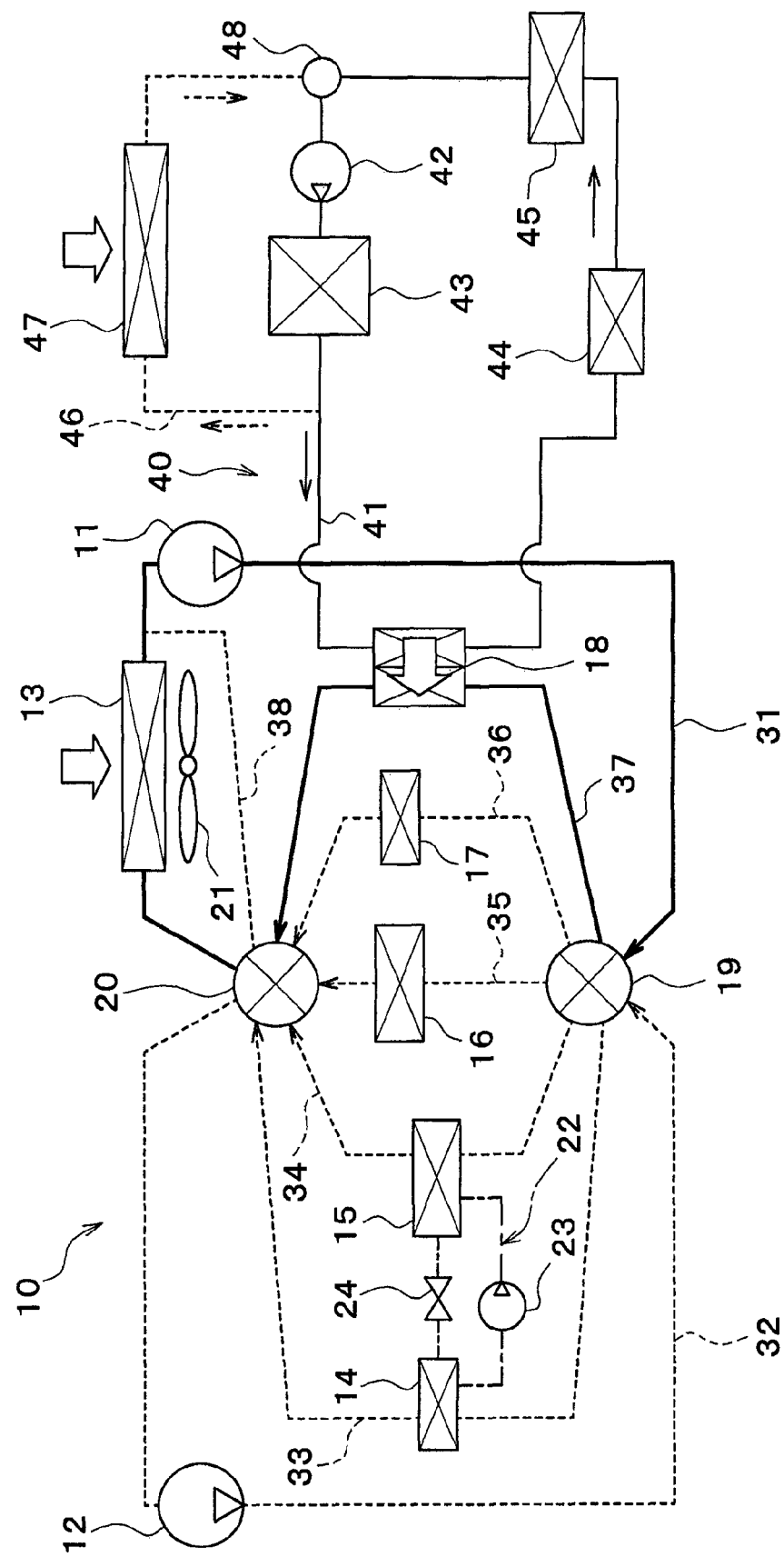
FIG. 5 is a diagram for explaining a second mode of the vehicle thermal management system in the first embodiment.

FIG. 5 shows the operation of the thermal management system 10 performed when the first and second switching valves 19 and 20 are switched to the second mode. For simplifying the description, regarding the second mode, the operation of the first coolant circuit and the engine cooling circuit 40 will be described below, and the explanation of the operation of the second coolant circuit will be omitted.

The second mode is performed when removing frost formed on the radiator 13 therefrom, mainly in winter.

In the second mode, the first switching valve 19 and the second switching valve 20 connect the first-pump flow path 31 to the coolant-coolant heat exchanger flow path 37.

In this way, the first pump 11 and the coolant-coolant heat exchanger 18 constitute the first coolant circuit (intermediate-temperature coolant circuit). In the first coolant circuit, as indicated by thick solid arrows of FIG. 5, the coolant discharged from the first pump 11 flows through the coolant-coolant heat exchanger 18 and the radiator 13 in series to be drawn into the first pump 11.

In the first coolant circuit, when flowing through the coolant-coolant heat exchanger 18, the coolant exchanges heat with the coolant in the engine cooling circuit 40 (high-temperature coolant circuit) to absorb heat therefrom. Thus, the coolant in the first coolant circuit is heated with waste heat from the engine 43 at the coolant-coolant heat exchanger 18. Since the coolant heated by the coolant-coolant heat exchanger 18 flows through the radiator 13, the frost attached to the radiator 13 can be removed.

For example, when the outside air temperature is 0° C., the temperature of the engine coolant in the engine cooling circuit 40 is at about 60° C., and the temperature of the coolant in the first cooling circuit is at about 30° C. In this case, the thermostat 48 closes the engine radiator flow path 46, whereby the engine coolant in the engine cooling circuit 40 does not flow through the engine radiator 47.

Figure 6:
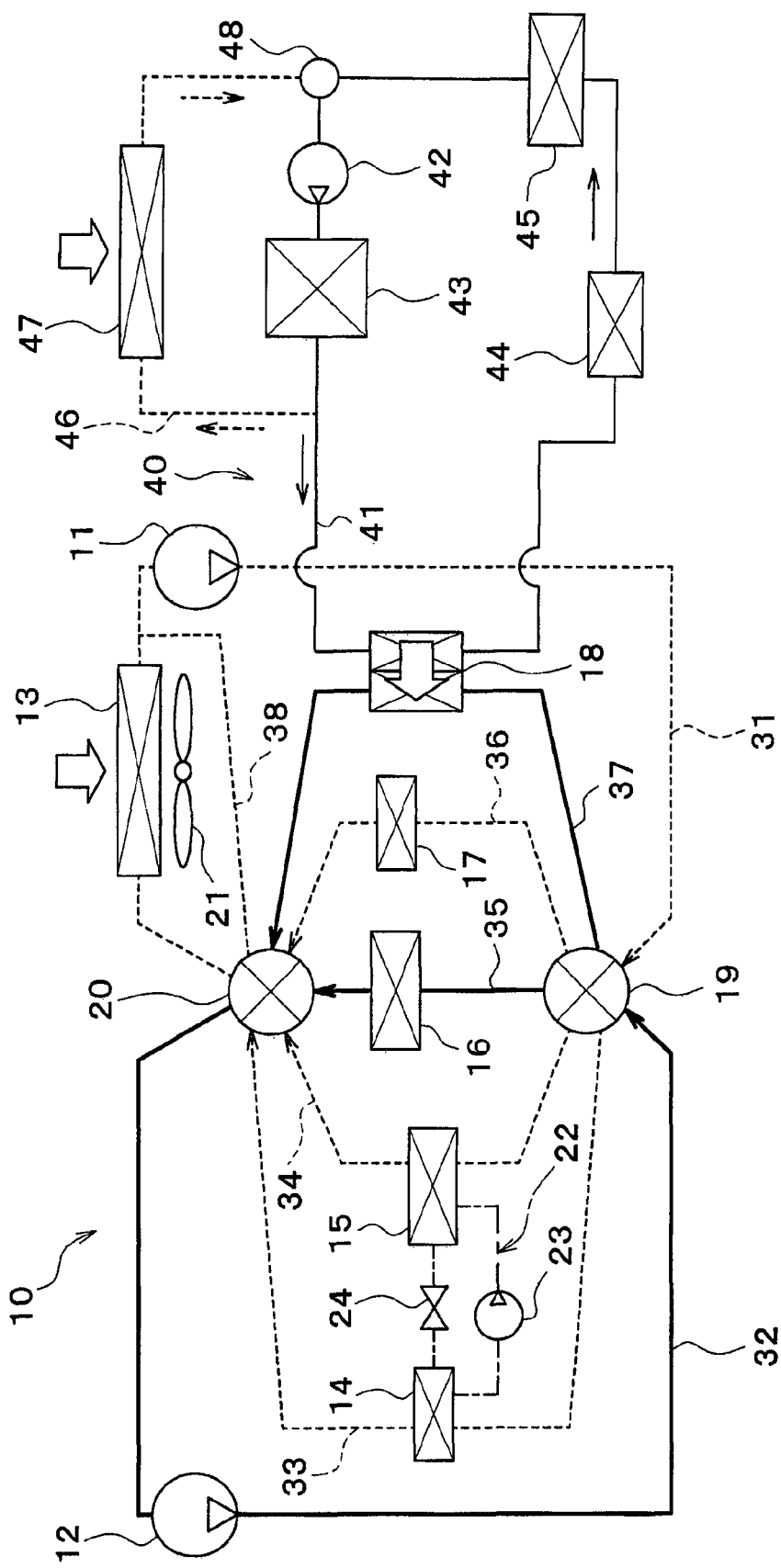
FIG. 6 is a diagram for explaining a third mode of the vehicle thermal management system in the first embodiment.

FIG. 6 shows the operation of the thermal management system 10 performed when the first and second switching valves 19 and 20 are switched to the third mode. For simplifying the description, regarding the third mode, the operations of the second coolant circuit and the engine cooling circuit 40 will be described below, and the explanation of the operation of the first coolant circuit will be omitted.

The third mode is performed when the coolant temperature in the engine cooling circuit 40 (high-temperature coolant circuit) is sufficiently high, mainly in winter.

In the third mode, the first switching valve 19 and the second switching valve 20 connect the second-pump flow path 32 to the intake-air cooler flow path 35 and the coolant-coolant heat exchanger flow path 37.

In this way, the second pump 12, the intake air cooler 16 and the coolant-coolant heat exchanger 18 constitute the second coolant circuit (intermediate-temperature coolant circuit). As indicated by thick solid arrows of FIG. 6, the coolant discharged from the second pump 12 flows through the intake air cooler 16 and the coolant-coolant heat exchanger 18 in parallel to be drawn into the second pump 12.

In the second coolant circuit, when flowing through the coolant-coolant heat exchanger 18, the coolant exchanges heat with the engine coolant in the engine cooling circuit 40 to absorb heat therefrom. Thus, the coolant in the first coolant circuit is heated with waste heat from the engine 43 at the coolant-coolant heat exchanger 18. Since the coolant heated by the coolant-coolant heat exchanger 18 flows through the intake air cooler 16, the intake air into the engine can be warmed at the intake air cooler 16.

For example, when the outside air temperature is 0° C., the temperature of the engine coolant in the engine cooling circuit 40 is at about 60° C., and the temperature of the coolant in the first cooling circuit is at about 50° C. In this case, the thermostat 48 closes the engine radiator flow path 46, whereby the engine coolant in the engine cooling circuit 40 does not flow through the engine radiator 47.

Figure 7:
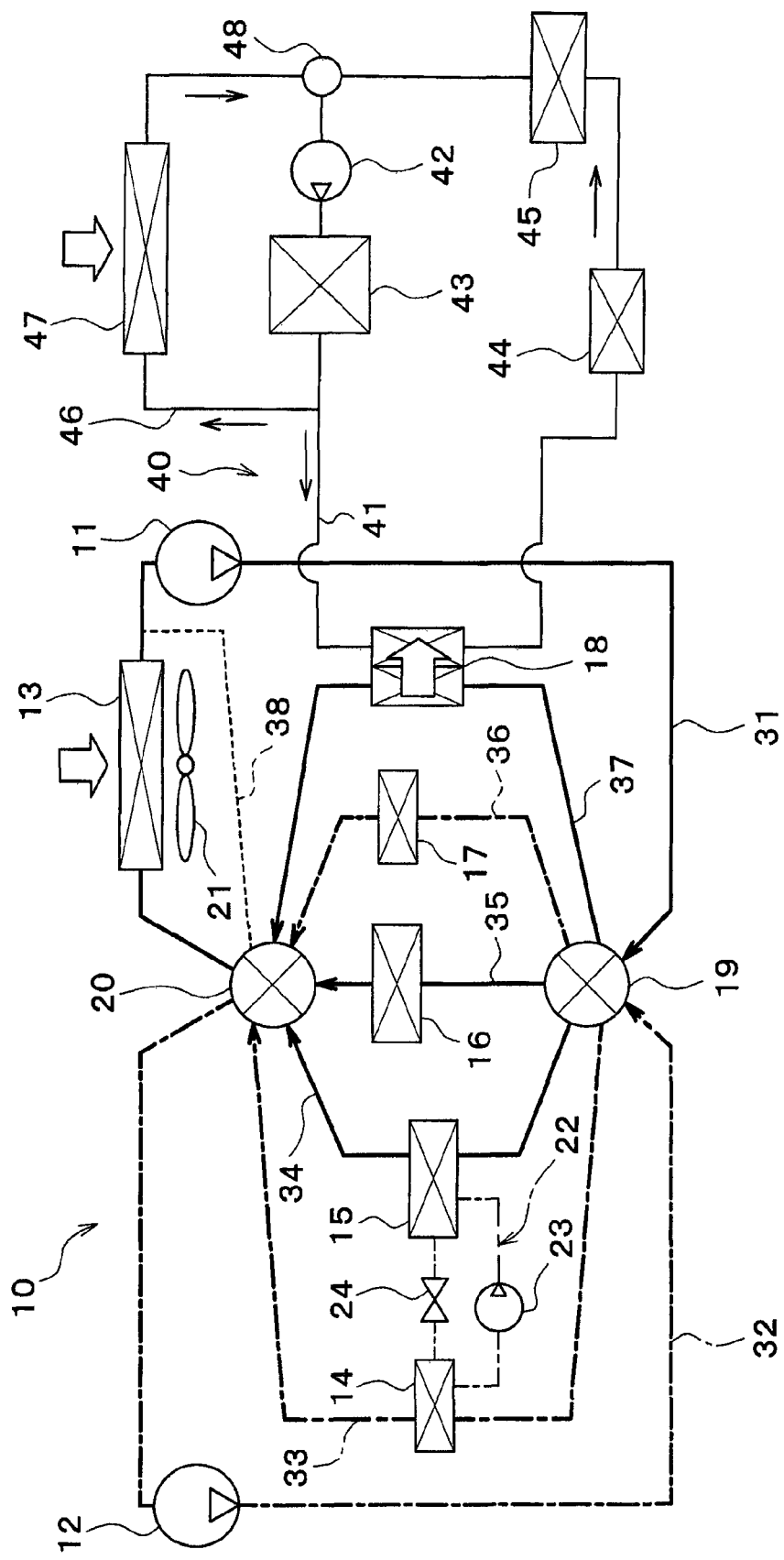
FIG. 7 is a diagram for explaining a fourth mode of the vehicle thermal management system in the first embodiment.

FIG. 7 shows the operation of the thermal management system 10 performed when the first and second switching valves 19 and 20 are switched to the fourth mode. The fourth mode is performed when the engine 43 is stopped, mainly in summer.

In the fourth mode, the first switching valve 19 and the second switching valve 20 connect the first-pump flow path 31 to the coolant-heater flow path 34, the intake-air cooler flow path 35, and the coolant-coolant heat exchanger flow path 37, and also connect the second-pump flow path 32 to the coolant-cooler flow path 33 and the cooler-core flow path 36.

Accordingly, the first pump 11, the coolant heater 15, the intake air cooler 16, the coolant-coolant heat exchanger 18, and the radiator 13 constitute the first coolant circuit (intermediate-temperature coolant circuit), whereas the second pump 12, the coolant cooler 14, and the cooler core 17 constitute the second coolant circuit (low-temperature coolant circuit).

In the first coolant circuit, as indicated by thick alternate long and short dashed arrows of FIG. 7, the coolant discharged from the first pump 11 flows through the coolant heater 15, the intake air cooler 16, and the coolant-coolant heat exchanger 18 in parallel, and then through the radiator 13 to be drawn into the first pump 11.

In the second coolant circuit, as indicated by thick solid arrows of FIG. 7, the coolant discharged from the second pump 12 flows through the coolant cooler 14 and the cooler core 17 in parallel to be drawn into the second pump 12.

In the second coolant circuit, the low-temperature coolant cooled by the coolant cooler 14 flows through the cooler core 17, allowing the coolant to absorb heat from the outside air in the cooler core 17. Thus, the air to be blown into the vehicle interior can be cooled by the cooler core 17, thereby performing air cooling of the vehicle interior.

Then, the coolant absorbing heat from the outside air in the cooler core 17 exchanges heat with the refrigerant in the refrigeration cycle 22 at the coolant cooler 14 to dissipate heat therefrom. Thus, in the coolant cooler 14, the refrigerant of the refrigeration cycle 22 absorbs heat from the outside air via the coolant.

The refrigerant absorbing heat from the outside air in the coolant cooler 14 exchanges heat with the coolant in the second coolant circuit at the coolant heater 15, whereby the coolant in the second coolant circuit is heated.

The coolant heated by the coolant heater 15 exchanges heat with the engine coolant in the engine cooling circuit 40 when flowing through the coolant-coolant heat exchanger 18 to dissipate heat therefrom. Thus, in the coolant-coolant heat exchanger 18, the engine coolant of the engine cooling circuit 40 is heated.

In this case, the thermostat 48 opens the engine radiator flow path 46, whereby the engine coolant in the engine cooling circuit 40 flows through the engine radiator 47. Thus, the heat of the engine coolant in the engine cooling circuit 40 can be dissipated into the outside air at the engine radiator 47.

That is, in the fourth mode, the heat generated at the coolant heater 15 can be dissipated into the outside air at two radiators, namely, the radiator 13 and the engine radiator 47, thereby enhancing the heat dissipation capacity to the outside air.

Figure 8:
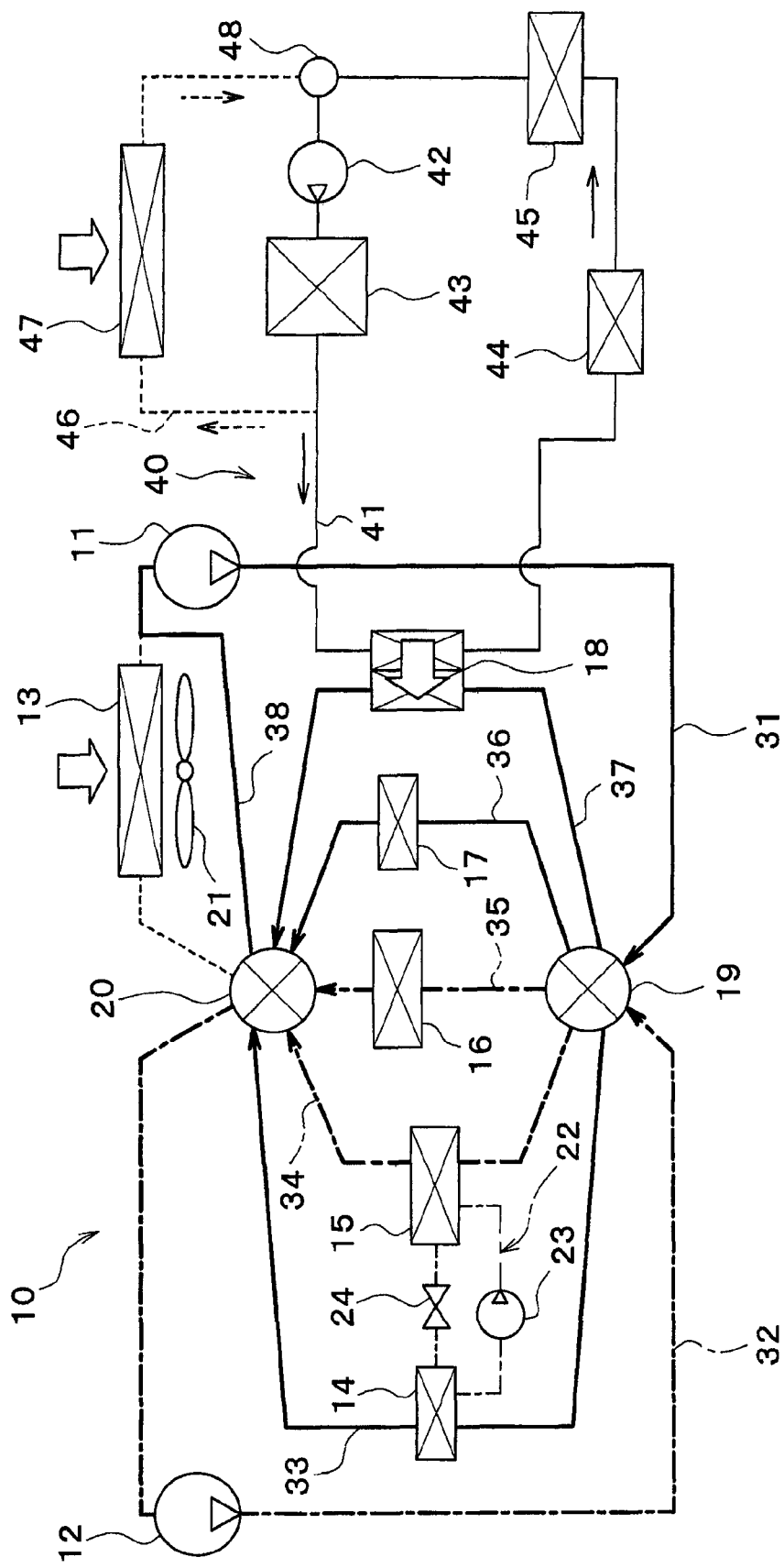
FIG. 8 is a diagram for explaining a fifth mode of the vehicle thermal management system in the first embodiment.

FIG. 8 shows the operation of the thermal management system 10 performed when the first and second switching valves 19 and 20 are switched to the fifth mode.

The fifth mode is performed when the coolant temperature in the first coolant circuit is sufficiently high, mainly in winter.

In the fifth mode, the first switching valve 19 and the second switching valve 20 connect the first-pump flow path 31 to the bypass flow path 38, the coolant-cooler flow path 33, the cooler-core flow path 36, and the coolant-coolant heat exchanger flow path 37, and also connect the second-pump flow path 32 to the coolant-heater flow path 34 and the intake-air cooler flow path 35.

Accordingly, the first pump 11, the coolant cooler 14, the cooler core 17, and the coolant-coolant heat exchanger 18 constitute a first coolant circuit (low-temperature coolant circuit), while the second pump 12, the coolant heater 15, and the intake air cooler 16 constitute a second coolant circuit (intermediate-temperature coolant circuit).

In the first coolant circuit, as indicated by thick solid arrows of FIG. 8, the coolant discharged from the first pump 11 flows through the coolant cooler 14, the cooler core 17, and the coolant-coolant heat exchanger 18 in parallel to be drawn into the first pump 11.

In the second coolant circuit, as indicated by thick alternate long and short dashed arrows of FIG. 8, the coolant discharged from the second pump 12 flows through the coolant heater 15 and the intake air cooler 16 in parallel to be drawn into the second pump 12.

In the first coolant circuit, the low-temperature coolant cooled by the coolant cooler 14 flows through the coolant-coolant heat exchanger 18 without flowing through the radiator 13, whereby the coolant absorbs heat from the engine coolant in the engine cooling circuit 40 to be heated at the coolant-coolant heat exchanger 18. Then, the coolant heated by the coolant-coolant heat exchanger 18 exchanges heat with the refrigerant of the refrigeration cycle 22 at the coolant cooler 14 to dissipate heat therefrom. Thus, in the coolant cooler 14, the refrigerant of the refrigeration cycle 22 absorbs waste heat from the engine 43 via the coolant.

The refrigerant absorbing waste heat from the engine 43 at the coolant cooler 14 exchanges heat with the coolant in the second coolant circuit at the coolant heater 15, whereby the coolant in the second coolant circuit is heated.

Since the coolant heated by the coolant heater 15 flows through the intake air cooler 16, the intake air into the engine can be warmed at the intake air cooler 16.

Unlike the first mode, in the fifth mode, the radiator 13 does not absorb heat from outside air, which does not cause frost formation at the radiator 13.

For example, when the outside air temperature is 0° C., the coolant temperature in the first coolant circuit is at about 0° C., the coolant temperature in the second coolant circuit is at about 50° C., and the temperature of the engine coolant in the engine cooling circuit 40 is at about 60° C. In this case, the thermostat 48 closes the engine radiator flow path 46, whereby the engine coolant in the engine cooling circuit 40 does not flow through the engine radiator 47.

Figure 9:
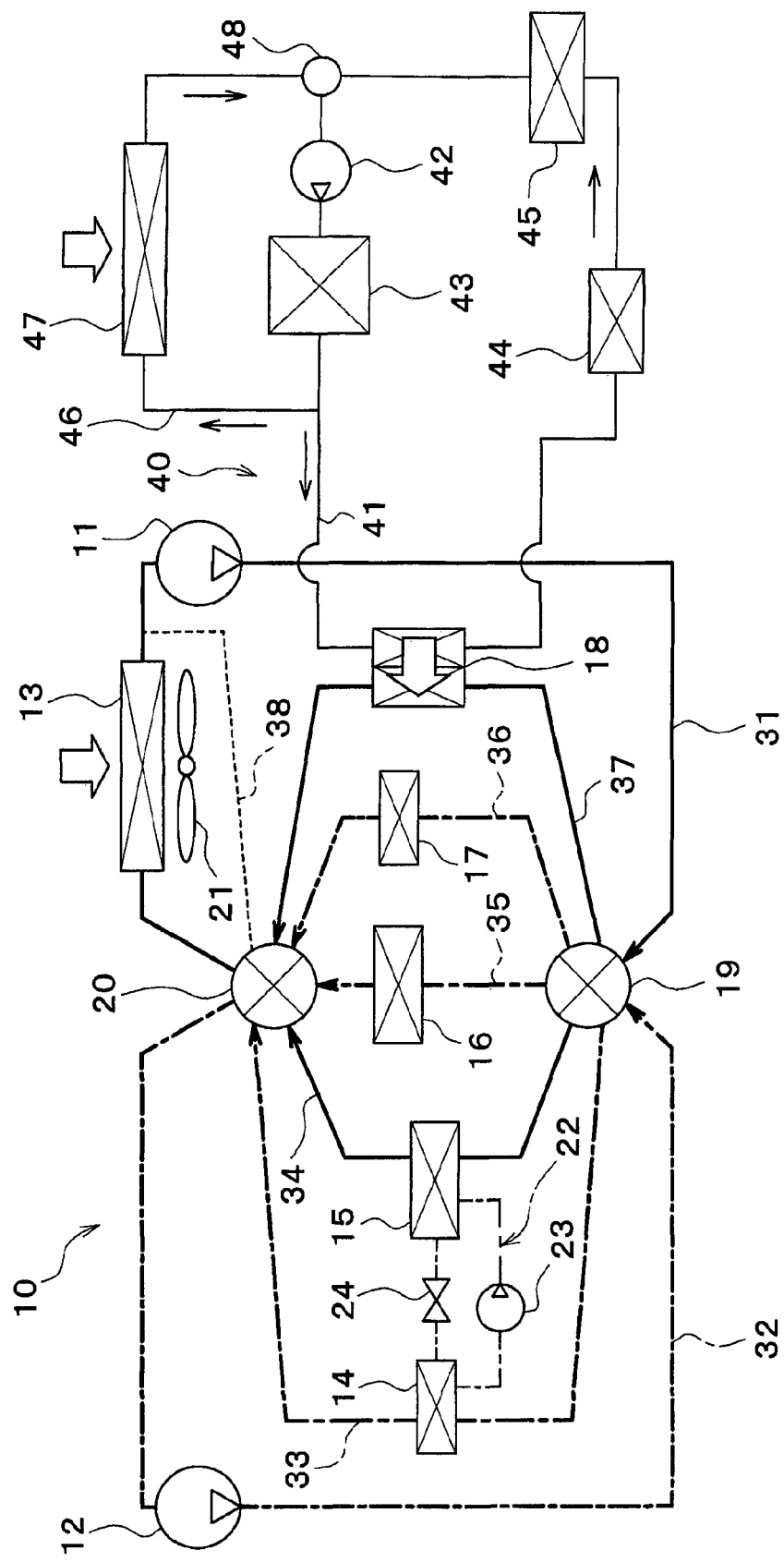
FIG. 9 is a diagram for explaining a sixth mode of the vehicle thermal management system in the first embodiment.

FIG. 9 shows the operation of the thermal management system 10 performed when the first and second switching valves 19 and 20 are switched to the sixth mode. The sixth mode is performed when the engine 43 is operating, mainly in summer.

In the sixth mode, the first switching valve 19 and the second switching valve 20 connect the first-pump flow path 31 to the coolant-heater flow path 34 and the coolant-coolant heat exchanger flow path 37, and also connect the second-pump flow path 32 to the coolant-cooler flow path 33, the intake-air cooler flow path 35, and the cooler-core flow path 36.

Accordingly, the first pump 11, the coolant heater 15, the coolant-coolant heat exchanger 18, and the radiator 13 constitute the first coolant circuit (intermediate-temperature coolant circuit), whereas the second pump 12, the coolant cooler 14, the intake air cooler 16, and the cooler core 17 constitute the second coolant circuit (low-temperature coolant circuit).

In the first coolant circuit, as indicated by thick solid arrows of FIG. 9, the coolant discharged from the first pump 11 flows through the coolant heater 15 and the coolant-coolant heat exchanger 18 in parallel and then through the radiator 13 to be drawn into the first pump 11.

In the second coolant circuit, as indicated by thick alternate long and short dashed arrows of FIG. 9, the coolant discharged from the second pump 12 flows through the coolant cooler 14, the intake air cooler 16, and the cooler core 17 in parallel to be drawn into the second pump 12.

In the second coolant circuit, the low-temperature coolant cooled by the coolant cooler 14 flows through the intake air cooler 16 and the cooler core 17, whereby the coolant absorbs heat from the engine intake air at the intake air cooler 16 and also absorbs heat from the outside air at the cooler core 17. Thus, the engine intake air can be cooled by the intake air cooler 16, and the air to be blown into the vehicle interior can be cooled by the cooler core 17, thereby cooling the vehicle interior.

Then, the coolant absorbing heat from the engine intake air and the outside air at the intake air cooler 16 and the cooler core 17 exchanges heat with the refrigerant of the refrigeration cycle 22 at the coolant cooler 14 to dissipate heat therefrom. Thus, at the coolant cooler 14, the refrigerant of the refrigeration cycle 22 absorbs heat from the engine intake air and the outside air via the coolant.

The refrigerant absorbing heat from the engine intake air and outside air at the coolant cooler 14 exchanges heat with the coolant in the second coolant circuit at the coolant heater 15, thereby heating the coolant in the second coolant circuit.

The coolant heated by the coolant heater 15 exchanges heat with the engine coolant in the engine cooling circuit 40 when flowing through the coolant-coolant heat exchanger 18, thus dissipating heat therefrom. Thus, in the coolant-coolant heat exchanger 18, the engine coolant of the engine cooling circuit 40 can be cooled.

In this case, the thermostat 48 opens the engine radiator flow path 46, whereby the engine coolant in the engine cooling circuit 40 flows through the engine radiator 47. Thus, the heat of the engine coolant in the engine cooling circuit 40 can be dissipated into the outside air at the engine radiator 47.

The coolant absorbing heat from the engine cooling circuit 40 at the coolant-coolant heat exchanger 18 exchanges heat with outside air at the radiator 13, thereby dissipating heat therefrom to be cooled.

That is, in the sixth mode, the heat generated at the engine 43 can be dissipated into the outside air at two radiators, namely, the radiator 13 and the engine radiator 47, thereby enhancing the heat dissipation capacity to the outside air.

In this embodiment, the first pump 11 and the second pump 12 are connected in parallel with the first switching vale 19 and the second switching valve 20, the devices 14, 15, 16, and 17 are connected in parallel between the first and second switching valves 19 and 20, and the first and second switching valves 19 and 20 switch the flow of the first heat medium among the devices 14, 15, 16, and 17. Thus, the devices 14, 15, 16, and 17 can be switched between the state of circulation of the coolant on the first pump 11 side and the state of circulation of the coolant on the second pump 12 side.

Further, the coolant-coolant heat exchanger 18 is provided for exchanging heat between the coolant and the engine coolant, so that the heat can be exchanged between the devices 14, 15, 16, and 17 and the engine 43 via the coolant-coolant heat exchanger 18.

In this embodiment, the first and second switching valves 19 and 20 can implement an operation mode (for example, the first mode) in which the coolant on a side of one of the first and second pumps 11 and 12 circulates through the coolant cooler 14 and the radiator 13, and the coolant on a side of the other of the first and second pumps 11 and 12 circulates through the coolant heater 15 and the coolant-coolant heat exchanger 18.

Thus, the heat of the outside air is absorbed in the coolant at the radiator 13, and the heat of the coolant is dissipated into the engine coolant at the coolant-coolant heat exchanger 18, which can heat the engine 43 by pumping up the heat of the outside air.

For example, when the temperature of the engine coolant is determined to be less than a predetermined temperature, the operation mode is carried out, so that the cooled engine 43 can be warmed up by pumping up the heat of the outside air.

Specifically, the first switching valve 19 and the second switching valve 20 can implement an operation mode (for example, the second mode and the sixth mode) of allowing the coolant on the side of one of the first and second pumps 11 and 12 to circulate through the radiator 13 and the coolant-coolant heat exchanger 18.

In this way, the heat of the engine coolant can be supplied to the radiator 13 via the coolant. Thus, like the second mode, the waste heat from the engine 43 can be used to melt the frost formed on the radiator 13, or like the sixth mode, the radiator 13 can be used to cool the engine 43.

In this embodiment, the first switching valve 19 and the second switching valve 20 can implement an operation mode (for example, the third mode) of allowing the coolant on the side of one of the first and second pumps 11 and 12 to circulate through the intake air cooler 16 and the coolant-coolant heat exchanger 18.

In this way, the heat of the engine coolant can be supplied to the intake air cooler 16 via the coolant. Thus, the waste heat from the engine 43 can heat the intake air cooler 16.

In this embodiment, the first switching valve 19 and the second switching valve 20 can implement an operation mode (for example, the fourth mode) of allowing the coolant on the side of one of the first and second pumps 11 and 12 to circulate through the coolant heater 15, the radiator 13, and the coolant-coolant heat exchanger 18.

Thus, the heat having dissipated from the high-pressure side refrigerant into the coolant at the coolant heater 15 can be further dissipated into the outside air at both the radiator 13 and the engine radiator 47.

In this embodiment, the first and second switching valves 19 and 20 can implement an operation mode (for example, the fifth mode) in which the coolant on the side of one of the first and second pumps 11 and 12 circulates through the coolant cooler 14 and the coolant-coolant heat exchanger 18, and the coolant on a side of the other of the first and second pumps 11 and 12 circulates through the coolant heater 15 and the intake air cooler 16.

Thus, the heat of the engine coolant is absorbed in the coolant at the coolant-coolant heat exchanger 18, and the heat of the coolant is supplied to the intake air cooler 16, which can heat the intake air cooler 16 by pumping up the heat held in the engine 43.

(Second Embodiment)

Figure 10:
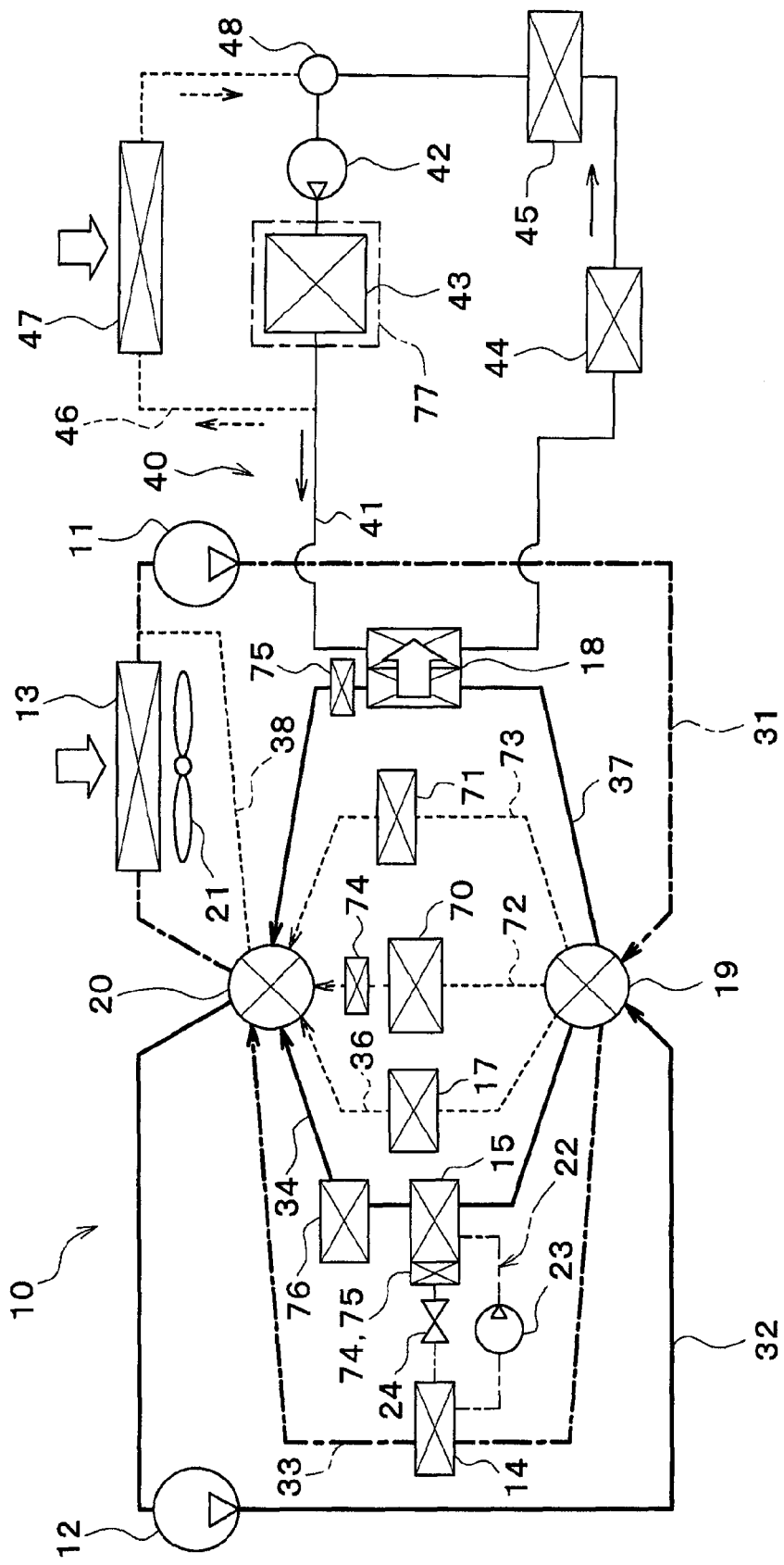
FIG. 10 is a diagram for explaining a first mode of the vehicle thermal management system according to a second embodiment.

In a second embodiment of the present disclosure, as shown in FIG. 10, instead of the intake air cooler 16, a battery cooler 70 and an inverter motor cooler 71 are provided with respect to the arrangement of the above-mentioned first embodiment.

The battery cooler 70 has a flow passage for coolant, and cools the battery by dissipating the heat from the battery into the coolant. The battery preferably has its temperature maintained in a range of about 10 to 40° C. for the purpose of preventing the reduction in output and charging efficiency, the degradation thereof, and the like.

The inverter motor cooler 71 has a flow passage for coolant, and cools an inverter and/or the traveling electric motor by applying the heat from the inverter and/or the traveling electric motor to the coolant. The inverter is a power converter that converts a direct-current (DC) power supplied from the battery to an alternating-current (AC) voltage to output the AC voltage to the traveling electric motor. The inverter preferably has its temperature maintained at 65° C. or lower for the purpose of preventing the degradation thereof or the like.

The battery cooler 70 is disposed in a battery cooler flow path 72. The inverter motor cooler 71 is disposed in an inverter motor cooler flow path 73.

In the battery cooler flow path 72, a first supercooler 74 is disposed on the downstream side of the coolant flow of the battery cooler 70. In the coolant-coolant heat exchanger flow path 37, a second supercooler 75 is disposed on the downstream side of the coolant flow of the coolant-coolant heat exchanger 18.

The first supercooler 74 and the second supercooler 75 are heat exchangers (refrigerant-heat medium heat exchanger) that further cool a liquid-phase refrigerant to increase a supercooling degree of the refrigerant by exchanging heat between the coolant and the liquid-phase refrigerant condensed by the coolant heater 15.

In the coolant-heater flow path 34, a sub-heater core 76 is disposed on the downstream side of the coolant flow of the coolant heater 15. Although not shown, the sub-heater core 76 is disposed on the downstream side of the air flow of the heater core 44 within the casing 51 of the interior air conditioning unit 50.

The engine 43 is covered with a thermal insulator 77. Thus, hot or cold heat can be stored in the engine 43. That is, the engine 43 stores therein the heat/cold.

The first switching valve 19 includes two inlets for the coolant, and six outlets for the coolant. The second switching valve 20 includes three outlets for the coolant, and six inlets for the coolant.

A first inlet of the first switching valve 19 is connected to one end of the first-pump flow path 31. In other words, the first inlet of the first switching valve 19 is connected to the coolant discharge side of the first pump 11.

A second inlet of the first switching valve 19 is connected to one end of the second-pump flow path 32. In other words, the second inlet of the first switching valve 19 is connected to the coolant discharge side of the second pump 12.

A first outlet of the first switching valve 19 is connected to one end of the coolant-cooler flow path 33. In other words, the first outlet of the first switching valve 19 is connected to the coolant inlet side of the coolant cooler 14.

A second outlet of the first switching valve 19 is connected to one end of the coolant-heater flow path 34. In other words, the second outlet of the first switching valve 19 is connected to the coolant inlet side of the coolant heater 15.

A third outlet of the first switching valve 19 is connected to one end of the cooler-core flow path 36. In other words, the third outlet of the first switching valve 19 is connected to the coolant inlet side of the cooler core 17.

A fourth outlet of the first switching valve 19 is connected to one end of the battery cooler flow path 72. In other words, the fourth outlet of the first switching valve 19 is connected to the coolant inlet side of the battery cooler 70.

A fifth outlet of the first switching valve 19 is connected to one end of the inverter motor cooler flow path 73. In other words, the fifth outlet of the first switching valve 19 is connected to the coolant inlet side of the inverter motor cooler 71.

A sixth outlet of the first switching valve 19 is connected to one end of the coolant-coolant heat exchanger flow path 37. In other words, the sixth outlet of the first switching valve 19 is connected to the coolant inlet side of the coolant-coolant heat exchanger 18.

A first outlet of the second switching valve 20 is connected to the other end of the first-pump flow path 31. In other words, the first outlet of the second switching valve 20 is connected to the coolant inlet side of the radiator 13.

A second outlet of the second switching valve 20 is connected to the other end of the second-pump flow path 32. In other words, the second outlet of the second switching valve 20 is connected to the coolant suction side of the second pump 12.

A third outlet of the second switching valve 20 is connected to one end of the bypass flow path 38. The bypass flow path 38 is a flow path that allows the coolant to flow bypassing the radiator 13. The other end of the bypass flow path 38 is connected to a part between the radiator 13 and the coolant suction port of the first pump 11 in the first-pump flow path 31.

A first inlet of the second switching valve 20 is connected to the other end of the coolant-cooler flow path 33. In other words, the first inlet of the second switching valve 20 is connected to the coolant outlet side of the coolant cooler 14.

A second inlet of the second switching valve 20 is connected to the other end of the coolant-heater flow path 34. In other words, the second inlet of the second switching valve 20 is connected to the coolant outlet side of the sub-heater core 76.

A third inlet of the second switching valve 20 is connected to the other end of the cooler-core flow path 36. In other words, the third inlet of the second switching valve 20 is connected to the coolant outlet side of the cooler core 17.

A fourth inlet of the second switching valve 20 is connected to the other end of the battery cooler flow path 72. In other words, the fourth inlet of the second switching valve 20 is connected to the coolant outlet side of the first supercooler 74.

A fifth inlet of the second switching valve 20 is connected to the other end of the inverter motor cooler flow path 73. In other words, the fifth inlet of the second switching valve 20 is connected to the coolant outlet side of the inverter motor cooler 71.

A sixth inlet of the second switching valve 20 is connected to the other end of the coolant-coolant heat exchanger flow path 37. In other words, the sixth inlet of the second switching valve 20 is connected to the coolant outlet side of the second supercooler 75.

The first switching valve 19 can be configured to arbitrarily or selectively switch the communication states between the two inlets and the six outlets. The second switching valve 20 can also be configured to arbitrarily or selectively switch the communication states between the three outlets and the six inlets.

Figure 11:
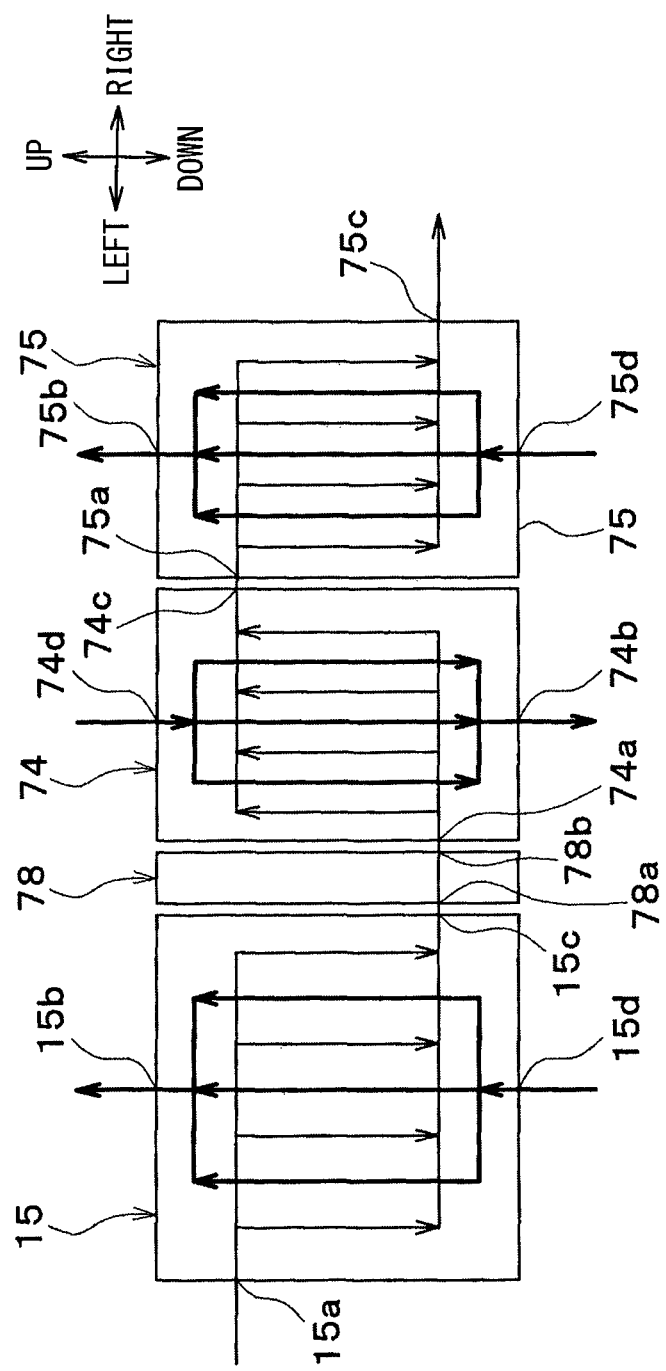
FIG. 11 is a front view of a coolant heater, a modulator, a first supercooler, and a second supercooler in the second embodiment.

As shown in FIG. 11, the first supercooler 74 and the second supercooler 75 are integrated with the coolant heater 15 and a modulator 78. The upward and downward arrows shown in FIG. 11 indicate the vertical direction (direction of gravitational force) in a vehicle-mounted state. The leftward and rightward arrows shown in FIG. 11 indicate the transverse direction (horizontal direction) in the vehicle-mounted state.

The modulator 78 is a liquid receiver (gas-liquid separator) that separates the refrigerant condensed by the coolant heater 15 into gas and liquid phase refrigerants to store therein the excessive refrigerant, while making only the liquid-phase refrigerant flow to the downstream side.

The coolant heater 15, the modulator 78, the first supercooler 74, and the second supercooler 75 are integrated as a lamination type heat exchanger formed by stacking and bonding a number of plate-like members and arranged in this order in the lamination direction of the plate-like members (in the leftward and rightward direction of FIG. 11). The numerous plate-like members are bonded together by soldering.

Each of the coolant heater 15, the first supercooler 74, and the second supercooler 75 includes a plurality of tubes and tank portions. The tubes are arranged to be laminated in the lamination direction of the plate-like members (in the leftward and rightward direction of FIG. 11), allowing the coolant and the refrigerant to independently circulated therethrough.

Further, the tubes are arranged to have their longitudinal direction in parallel to the vertical direction. The tank portions are disposed on both sides of the tubes to distribute and collect the coolant and refrigerant for the tubes.

The upper tank portion of the coolant heater 15 is provided with an inlet 15a (refrigerant inlet) for the refrigerant, and an outlet 15b (heat medium outlet) for the coolant. The lower tank portion of the coolant heater 15 is provided with an outlet 15c (refrigerant outlet) for the refrigerant, and an inlet 15d (heat medium inlet) for the coolant.

Thus, in the coolant heater 15, the refrigerant flows from the inlet 15a into the upper tank portion, and is then distributed to tubes for a refrigerant by the upper tank portion. The refrigerants after having passed through the refrigerant tubes are collected into the lower tank portion to flow out of the outlet 15c.

In the coolant heater 15, the coolant flows from the inlet 15d into the lower tank portion, and is then distributed to tubes for a coolant (tubes for a heat medium) by the lower tank portion. The coolants after having passed through the coolant tubes are collected into the upper tank portion to flow out of the outlet 15b.

The refrigerant inlet 15a of the coolant heater 15 is disposed at one end in the tube lamination direction of the coolant heater 15 (at the left end shown in FIG. 11) and opened toward one side in the tube lamination direction (leftward shown in FIG. 11). Specifically, the refrigerant inlet 15a is disposed at an end of the coolant heater 15 opposite to the modulator 78 and opened toward the side opposite to the modulator 78.

The refrigerant outlet 15c of the coolant heater 15 is disposed at the other end in the tube lamination direction of the coolant heater 15 (at the right end shown in FIG. 11) and opened toward the other side in the tube lamination direction (rightward shown in FIG. 11). Specifically, the refrigerant outlet 15c is disposed at an end of the coolant heater 15 on a side of the modulator 78 and opened toward the modulator 78.

The inlet 15d and outlet 15b for the coolant of the coolant heater 15 are disposed between both ends in the tube lamination direction of the coolant heater 15 (both ends in the left-right direction of FIG. 11). Thus, the coolant heater 15 does not allow the flow of coolant to make a U-turn.

The inlet 15d and outlet 15b for the coolant of the coolant heater 15 are opened while being oriented in the direction perpendicular to the tube lamination direction of the tubes. In the example shown in FIG. 11, the inlet 15d and outlet 15b for the coolant of the coolant heater 15 are opened toward the direction parallel to the refrigerant tubes and the coolant tubes (in the vertical direction).

The modulator 78 is formed with an inlet 78a for a refrigerant (refrigerant inlet) and an outlet 78b for a refrigerant (refrigerant outlet).

The refrigerant inlet 78a of the modulator 78 is disposed at one end of the modulator 78 in the tube lamination direction (at the left end shown in FIG. 11) and opened toward one side in the tube lamination direction (leftward shown in FIG. 11). Specifically, the refrigerant inlet 78a is disposed at an end of the modulator 78 opposite to the first supercooler 74 and opened toward the side opposite to the first supercooler 74. The refrigerant inlet 78a of the modulator 78 is superimposed over the refrigerant outlet 15c of the coolant heater 15.

The refrigerant outlet 78b of the modulator 78 is disposed at the other end of the modulator 78 in the tube lamination direction (at the right end shown in FIG. 11) and opened toward the other side in the tube lamination direction (rightward shown in FIG. 11). Specifically, the refrigerant outlet 78b is disposed at an end of the modulator 78 on a side of the first supercooler 74 and opened toward the first supercooler 74.

The lower tank portion of the first supercooler 74 is provided with an inlet 74a for a refrigerant (refrigerant inlet), and an outlet 74b for a coolant (heat medium outlet). The upper tank portion of the first supercooler 74 is provided with an outlet 74c for a refrigerant (refrigerant outlet), and an inlet 74d for a coolant (heat medium inlet).

Thus, in the first supercooler 74, the refrigerant flows from the inlet 74a into the lower tank portion and is then distributed to the refrigerant tubes by the lower tank portion. The refrigerants after having passed through the refrigerant tubes are collected into the upper tank portion to flow out of the outlet 74c.

In the first supercooler 74, the coolant flows from the inlet 74d into the upper tank portion, and is then distributed to the coolant tubes (heat medium tubes) by the upper tank portion. The coolants after having passed through the coolant tubes are collected into the lower tank portion to flow out of the outlet 74b.

The refrigerant inlet 74a of the first supercooler 74 is disposed at one end in the tube lamination direction of the first supercooler 74 (at the left end shown in FIG. 11) and opened toward one side in the tube lamination direction (leftward shown in FIG. 11). Specifically, the refrigerant inlet 74a is disposed at an end of the first supercooler 74 opposite to the second supercooler 75 and opened toward the side opposite to the second supercooler 75. The refrigerant inlet 74a of the first supercooler 74 is superimposed over the refrigerant outlet 78b of the modulator 78.

The refrigerant outlet 74c of the first supercooler 74 is disposed at the other end in the tube lamination direction of the first supercooler 74 (at the right end shown in FIG. 11) and opened toward the other side in the tube lamination direction (rightward shown in FIG. 11). Specifically, the refrigerant outlet 74c is disposed at an end of the first supercooler 74 on a side of the second supercooler 75 and opened toward the side opposite to the second supercooler 75.

The coolant inlet 74d and outlet 74b of the first supercooler 74 are disposed between both ends in the tube lamination direction of the first supercooler 74 (both ends in the leftward and rightward directions of FIG. 11). Thus, the first supercooler 74 does not allow the flow of coolant to make a U-turn.

The coolant inlet 74d and outlet 74b of the first supercooler 74 are opened while being oriented in the direction perpendicular to the tube lamination direction. In the example shown in FIG. 11, the coolant inlet 74d and outlet 74b of the first supercooler 74 are opened toward the direction parallel to the refrigerant tubes and the coolant tubes (in the vertical direction).

The upper tank portion of the second supercooler 75 is provided with an inlet 75a for a refrigerant (refrigerant inlet), and an outlet 75b for a coolant (heat medium outlet). The lower tank portion of the second supercooler 75 is provided with an outlet 75c for a refrigerant (refrigerant outlet), and an inlet 75d for a coolant (heat medium inlet).

Thus, in the second supercooler 75, the refrigerant flows from the inlet 75a into the upper tank portion and is then distributed to the refrigerant tubes by the upper tank portion. The refrigerants after having passed through the refrigerant tubes are collected into the lower tank portion to flow out of the outlet 75c.

In the second supercooler 75, the coolant flows from the inlet 75d into the lower tank portion, and is then distributed to the coolant tubes (heat medium tubes) by the lower tank portion. The coolants after having passed through the coolant tubes are collected into the upper tank portion to flow out of the outlet 75b.

The refrigerant inlet 75a of the second supercooler 75 is disposed at one end in the tube lamination direction of the second supercooler 75 (at the left end shown in FIG. 11) and opened toward one side in the tube lamination direction (leftward shown in FIG. 11). Specifically, the refrigerant inlet 75a is disposed at an end of the second supercooler 75 on the first supercooler 74 side and opened toward the side of the first supercooler 74. The refrigerant inlet 75a of the second supercooler 75 is superimposed over the refrigerant outlet 74c of the first supercooler 74.

The refrigerant outlet 75c of the second supercooler 75 is disposed at the other end in the tube lamination direction of the second supercooler 75 (at the right end shown in FIG. 11) and opened toward the other side in the tube lamination direction (rightward shown in FIG. 11). Specifically, the refrigerant outlet 75c is disposed at an end of the second supercooler 75 opposite to the first supercooler 74 and opened toward the side opposite to the first supercooler 74.

The coolant inlet 75d and outlet 75b of the second supercooler 75 are disposed between both ends in the tube lamination direction of the second supercooler 75 (both ends in the leftward and rightward directions of FIG. 11). Thus, the second supercooler 75 does not allow the flow of coolant to make a U-turn.

The coolant inlet 75d and outlet 75b of the second supercooler 75 are opened while being oriented in the direction perpendicular to the tube lamination direction. In the example shown in FIG. 11, the coolant inlet 75d and outlet 75b of the second supercooler 75 are opened toward the direction parallel to the refrigerant tubes and the coolant tubes (in the vertical direction).

With the above-mentioned structure, the refrigerant flow through the coolant heater 15, the modulator 78, the first supercooler 74, and the second supercooler 75 in this order.

In the coolant heater 15, the refrigerant flows from the upper side to the lower side, while the coolant flows from the lower side to the upper side. In the first supercooler 74, the refrigerant flows from the lower side to the upper side, while the coolant flows from the upper side to the lower side. In the second supercooler 75, the refrigerant flows from the lower side to the upper side, while the coolant flows from the upper side to the lower side.

That is, the refrigerant and the coolant flow opposed to each other through the coolant heater 15, the first supercooler 74, and the second supercooler 75.

Note that the refrigerant inlet and outlet, and the coolant inlet and outlet in each of the coolant heater 15, the modulator 78, the first supercooler 74, and the second supercooler 75 may be reversed.

FIG. 10 shows the operation of the thermal management system 10 when the first and second switching valves 19 and 20 are switched to the first mode. The first mode is performed mainly in winter during charging a battery.

In the first mode, the first switching valve 19 and the second switching valve 20 connect the first-pump flow path 31 to the coolant-cooler flow path 33 and also connect the second-pump flow path 32 to the coolant-heater flow path 34 and the coolant-coolant heat exchanger flow path 37.

Accordingly, the first pump 11, the coolant cooler 14, and the radiator 13 constitute a first coolant circuit (low-temperature coolant circuit), while the second pump 12, the coolant heater 15, the sub-heater core 76, and the coolant-coolant heat exchanger 18 constitute a second coolant circuit (intermediate-temperature coolant circuit).

In the first coolant circuit, as indicated by thick alternate long and short dashed arrows of FIG. 10, the coolant discharged from the first pump 11 flows through the coolant cooler 14 and then through the radiator 13 to be drawn into the first pump 11.

In the second coolant circuit, as indicated by thick solid arrows of FIG. 10, the coolant discharged from the second pump 12 flows through the coolant heater 15, the sub-heater core 76, and the coolant-coolant heat exchanger 18 to be drawn into the second pump 12.

In the first coolant circuit, the low-temperature coolant cooled by the coolant cooler 14 flows through the radiator 13, allowing the coolant to absorb heat from the outside air in the radiator 13. Then, the coolant absorbing heat from the outside air in the radiator 13 exchanges heat with the refrigerant in the refrigeration cycle 22 at the coolant cooler 14 to dissipate heat therefrom. Thus, in the coolant cooler 14, the refrigerant in the refrigeration cycle 22 absorbs heat from outside air via the coolant.

The refrigerant absorbing heat from the outside air in the coolant cooler 14 via the coolant exchanges heat with the coolant in the second coolant circuit at the coolant heater 15, whereby the coolant in the second coolant circuit is heated. That is, the heat pump operation of pumping up the heat of outside air to the coolant in the second coolant circuit can be achieved.

The coolant heated by the coolant heater 15 exchanges heat with the engine coolant in the engine cooling circuit 40 when flowing through the coolant-coolant heat exchanger 18, thus dissipating heat therefrom. Thus, in the coolant-coolant heat exchanger 18, the engine coolant of the engine cooling circuit 40 can be heated.

Thus, the engine 43 can be heated in the engine cooling circuit 40. In this embodiment, the engine 43 is covered with the thermal insulator 77. Thus, the engine 43 can store heat therein.

Note that in the first mode before reaching this operating state, the coolant in the second coolant circuit is also allowed to circulate through the battery cooler 70, thereby heating the battery to store heat in the battery.

For example, when the outside air temperature is 0° C., the coolant temperature in the first coolant circuit is at about −10° C., the coolant temperature in the second coolant circuit is at about 70° C., and the temperature of the engine coolant in the engine cooling circuit 40 is at about 60° C. In this case, the thermostat 48 closes the engine radiator flow path 46, whereby the engine coolant in the engine cooling circuit 40 does not flow through the engine radiator 47.

Figure 12:
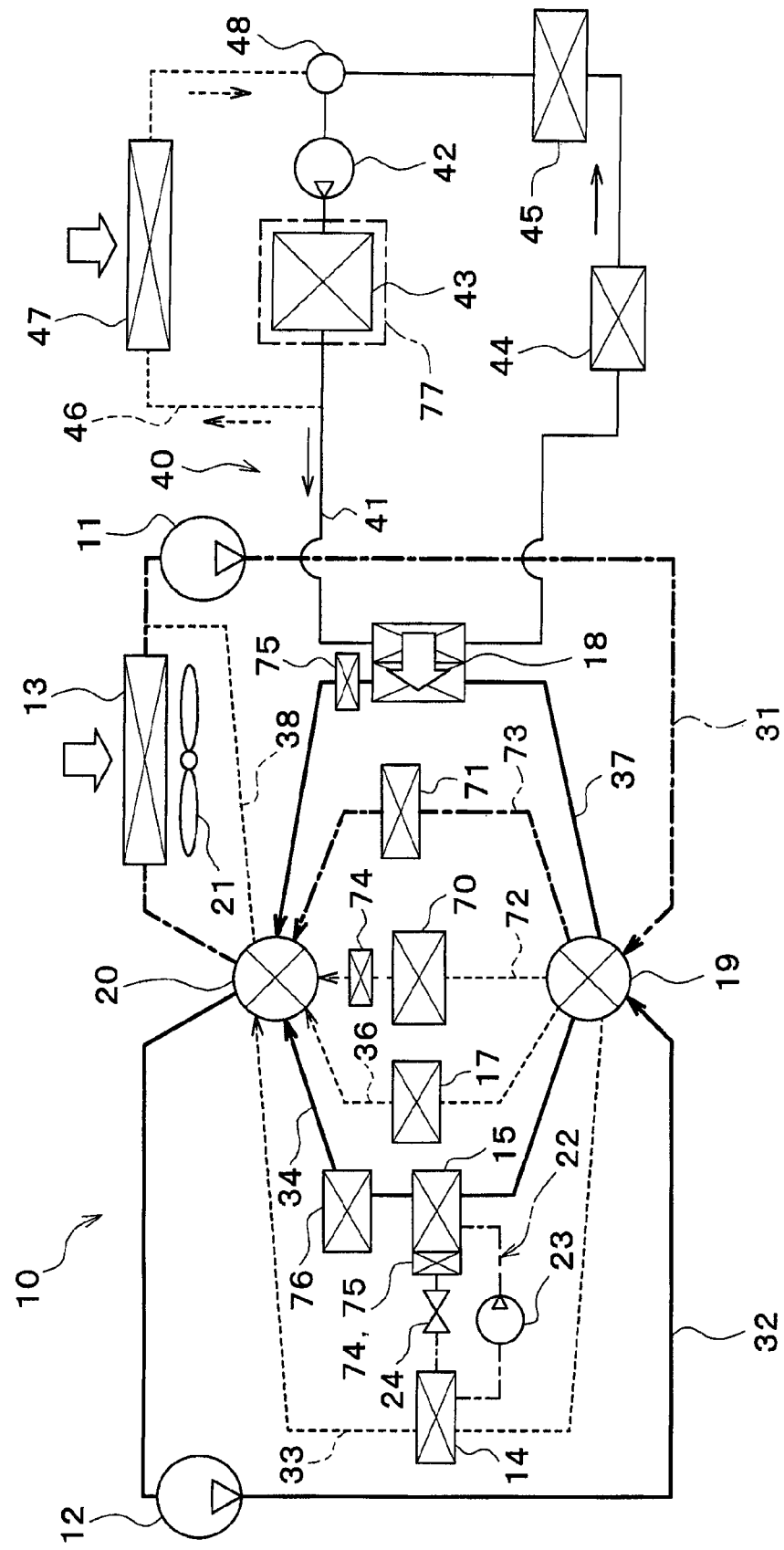
FIG. 12 is a diagram for explaining a second mode of the vehicle thermal management system in the second embodiment.

FIG. 12 shows the operation of the thermal management system 10 when the first and second switching valves 19 and 20 are switched to the second mode. The second mode is performed immediately after the first mode and after startup of the traveling electric motor, mainly in winter.

In the second mode, the first switching valve 19 and the second switching valve 20 connect the first-pump flow path 31 to the inverter motor cooler flow path 73, and also connect the second-pump flow path 32 to the coolant-heater flow path 34 and the coolant-coolant heat exchanger flow path 37.

Accordingly, the first pump 11, the inverter motor cooler 71, and the radiator 13 constitute a first coolant circuit (low-temperature coolant circuit), while the second pump 12, the coolant heater 15, the sub-heater cooler 76, and the coolant-coolant heat exchanger 18 constitute a second coolant circuit (intermediate-temperature coolant circuit).

In the first coolant circuit, as indicated by thick alternate long and short dashed arrows of FIG. 12, the coolant discharged from the first pump 11 flows through the inverter motor cooler 71 and then through the radiator 13 to be drawn into the first pump 11.

In the second coolant circuit, as indicated by thick solid arrows of FIG. 12, the coolant discharged from the second pump 12 flows through the coolant heater 15, the sub-heater core 76, and the coolant-coolant heat exchanger 18 to be drawn into the second pump 12.

In the engine cooling circuit 40, the coolant is heated with heat stored in the engine 43. The coolant heated with the heat stored in the engine 43 flows through the heater core 44 to heat the air to be blown into the vehicle interior, heating the vehicle interior.

The coolant heated with heat stored in the engine 43 exchanges heat with the coolant in the second coolant circuit when flowing through the coolant-coolant heat exchanger 18, thus dissipating heat therefrom. Thus, in the coolant-coolant heat exchanger 18, the coolant in the second coolant circuit can be heated.

The coolant in the second coolant circuit heated by the coolant-coolant heat exchanger 18 dissipates heat into air to be blown, into the vehicle interior when flowing through the sub-heater core 76, so that the air into the vehicle interior can be heated at the sub-heater core 76, thereby heating the vehicle interior.

In the first coolant circuit, the coolant cooled by the outside air at the radiator 13 flows through the inverter motor cooler 71 to enable cooling of the inverter.

Figure 13:
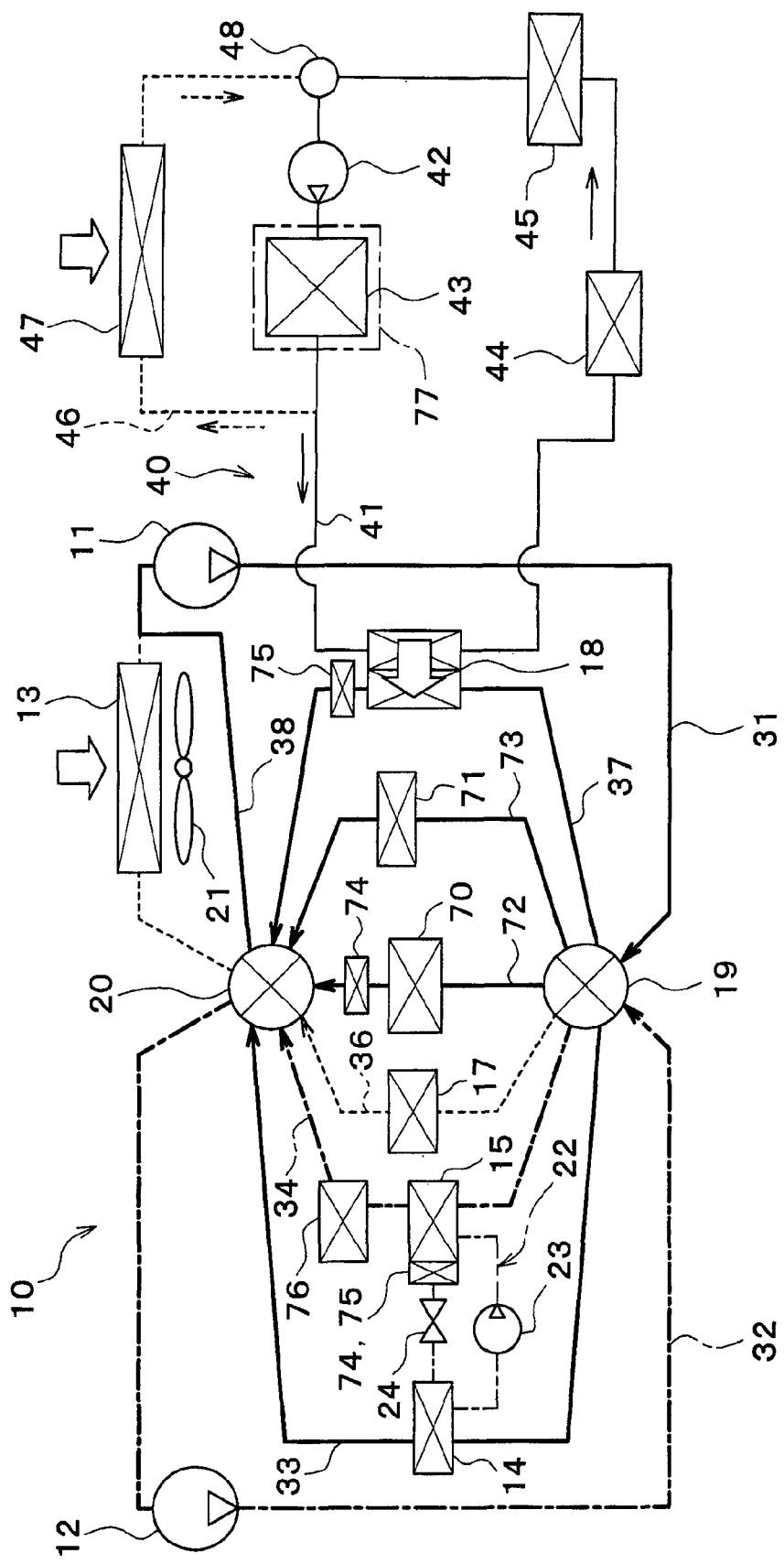
FIG. 13 is a diagram for explaining a third mode of the vehicle thermal management system in the second embodiment.

FIG. 13 shows the operation of the thermal management system 10 when the first and second switching valves 19 and 20 are switched to the third mode. The third mode is performed after the second mode and before the temperature of the engine coolant in the engine cooling circuit 40 is decreased to reduce the temperature of air blown into the vehicle whereby a passenger cannot feel sufficient warmth.

In the third mode, the first switching valve 19 and the second switching valve 20 connect the first-pump flow path 31 to the bypass flow path 38, the coolant-cooler flow path 33, the battery cooler flow path 72, the inverter motor cooler flow path 73, and the coolant-coolant heat exchanger flow path 37, and also connect the second-pump flow path 32 to the coolant-heater flow path 34.

Accordingly, the first pump 11, the coolant cooler 14, the battery cooler 70, the inverter motor cooler 71, and the coolant-coolant heat exchanger 18 constitute a first coolant circuit (low-temperature coolant circuit), while the second pump 12, the coolant heater 15, and the sub-heater core 76 constitute a second coolant circuit (intermediate-temperature coolant circuit).

In the first coolant circuit, as indicated by thick alternate long and short dashed arrows of FIG. 13, the coolant discharged from the first pump 11 flows through the coolant cooler 14, the battery cooler 70, and the inverter motor cooler 71 in parallel to be drawn into the first pump 11.

In the second coolant circuit, as indicated by thick solid arrows of FIG. 13, the coolant discharged from the second pump 12 flows through the coolant heater 15 and the sub-heater core 76 in series to be drawn into the second pump 12.

In the first coolant circuit, the low-temperature coolant cooled by the coolant cooler 14 flows through the battery cooler 70 and the coolant-coolant heat exchanger 18, whereby the coolant absorbs heat from the battery and the engine coolant at the coolant-coolant heat exchanger 18.

The coolant in the first coolant circuit that absorbs heat from the battery and the engine coolant of the engine cooling circuit 40 at the coolant-coolant heat exchanger 18 exchanges heat with the refrigerant of the refrigeration cycle 22 at the coolant cooler 14 to dissipate heat therefrom. Thus, in the coolant cooler 14, the refrigerant of the refrigeration cycle 22 absorbs heat from the battery and the engine coolant via the coolant.

The refrigerant absorbing heat from the battery and the engine coolant at the coolant cooler 14 exchanges heat with the coolant in the second coolant circuit at the coolant heater 15, whereby the coolant in the second coolant circuit is heated. That is, the heat pump operation of pumping up the heat of the battery and the engine coolant to the coolant in the second coolant circuit can be achieved.

The coolant heated by the coolant heater 15 exchanges heat with the air to be blown into the vehicle interior in flowing through the sub-heater core 76, thereby dissipating heat therefrom. Thus, the sub-heater core 76 heats the air to be blown into the vehicle interior.

The sub-heater core 76 is disposed on the downstream side of the air flow in the heater core 44, whereby the air to be blown into the vehicle interior is heated by the heater core 44 and the sub-heater core 76 in this order and then blown into the vehicle interior.

Thus, the heat stored in the battery and the engine 43 is pumped up to the air into the vehicle interior, making it possible to heat the vehicle interior.

For example, when the outside air temperature is 0° C., the coolant temperature in the first coolant circuit is at about 20° C., the coolant temperature in the second coolant circuit is at about 70° C., and the temperature of the engine coolant in the engine cooling circuit 40 is at about 40° C. In this case, the thermostat 48 closes the engine radiator flow path 46, whereby the engine coolant in the engine cooling circuit 40 does not flow through the engine radiator 47.

When the third mode is performed in winter during the operation of the engine 43, the waste heat from the engine 43 can be absorbed by the coolant in the first coolant circuit at the coolant-coolant heat exchanger 18, absorbed by the refrigerant in the refrigeration cycle 22 at the coolant cooler 14, dissipated into the coolant in the second coolant circuit at the coolant heater 15, and dissipated into the air to be blown to the vehicle interior at the sub-heater core 76.

Thus, the waste heat stored in the engine 43 can be pumped up to the air into the vehicle interior, making it possible to heat the vehicle interior.

Figure 14:
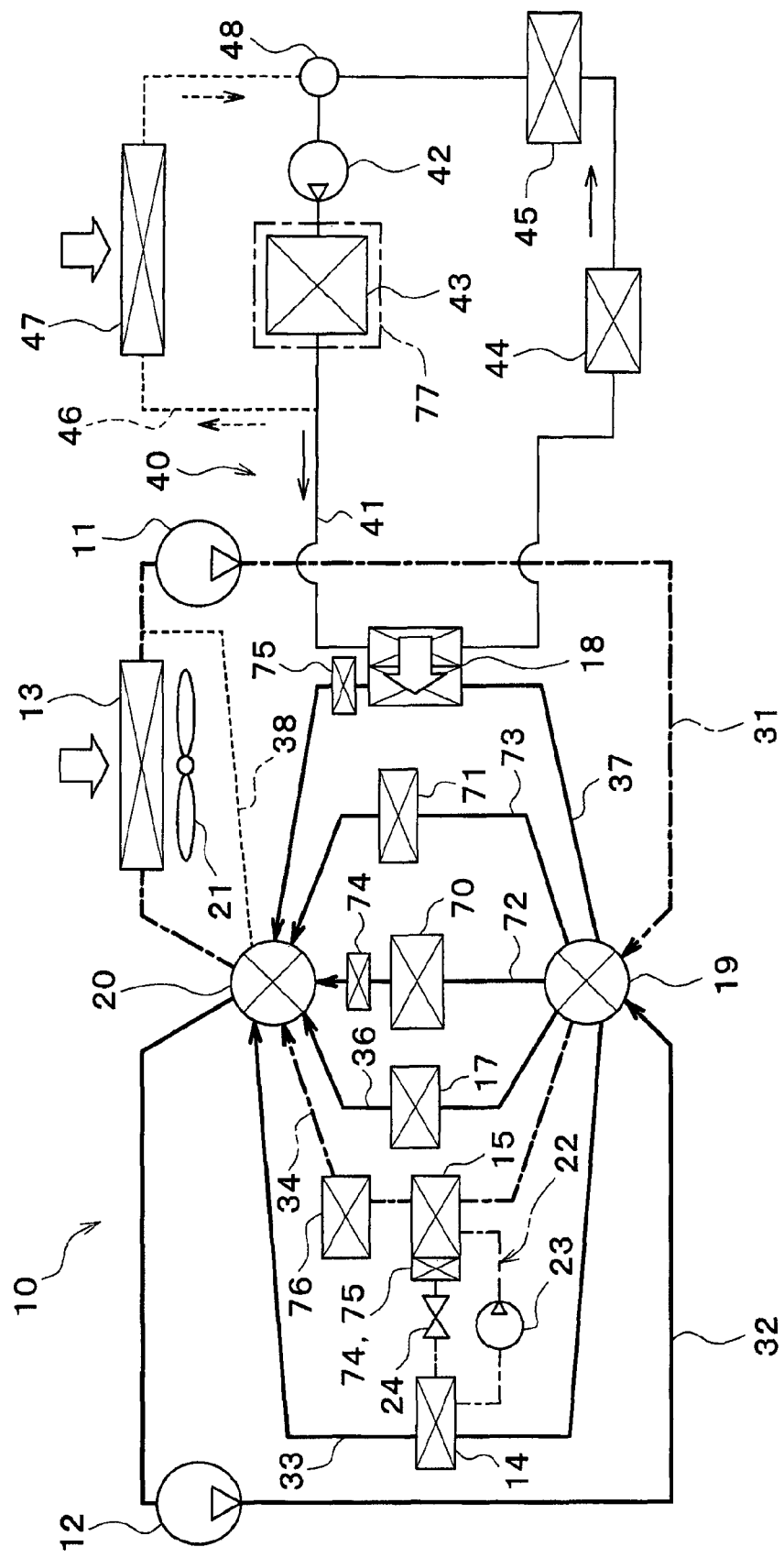
FIG. 14 is a diagram for explaining a fourth mode of the vehicle thermal management system in the second embodiment.

FIG. 14 shows the operation of the thermal management system 10 when the first and second switching valves 19 and 20 are switched to the fourth mode. The fourth mode is performed mainly in summer during charging the battery.

In the fourth mode, the first switching valve 19 and the second switching valve 20 connect the first-pump flow path 31 to the coolant-heater flow path 34 and also connect the second-pump flow path 32 to the coolant-cooler flow path 33, the cooler core flow path 36, the battery cooler flow path 72, the inverter motor cooler flow path 73, and the coolant-coolant heat exchanger flow path 37.

Accordingly, the first pump 11, the coolant heater 15, the sub-heater core 76, and the radiator 13 constitute a first coolant circuit (low-temperature coolant circuit), while the second pump 12, the coolant cooler 14, the cooler core 17, the battery cooler 70, the inverter motor cooler 71, and the coolant-coolant heat exchanger 18 constitute a second coolant circuit (intermediate-temperature coolant circuit).

In the first coolant circuit, as indicated by thick alternate long and short dashed arrows of FIG. 14, the coolant discharged from the first pump 11 flows through the coolant heater 15 and the sub-heater core 76 in series and then through the radiator 13 to be drawn into the first pump 11.

In the second coolant circuit, as indicated by thick solid arrows of FIG. 14, the coolant discharged from the second pump 12 flows through the coolant cooler 14, the cooler core 17, the battery cooler 70, the inverter motor cooler 71, and the coolant-coolant heat exchanger 18 in parallel to be drawn into the second pump 12.

In the second coolant circuit, the low-temperature coolant cooled by the coolant cooler 14 flows through the coolant-coolant heat exchanger 18, whereby the coolant absorbs heat from the engine coolant in the engine cooling circuit 40 at the coolant-coolant heat exchanger 18. Thus, in the coolant-coolant heat exchanger 18, the engine coolant is cooled.

The engine coolant cooled by the coolant-coolant heat exchanger 18 flows through the engine 43, thereby cooling the engine 43, so that the cold heat can be stored in the engine 43. Once the engine 43 is cooled to approximately 10° C., the first switching valve 19 and the second switching valve 20 are switched to terminate the circulation of the coolant to the coolant-coolant heat exchanger 18 in the second coolant circuit.

Further, the low-temperature coolant cooled by the coolant cooler 14 flows through the battery cooler 70, thereby cooling the battery, whereby cold heat can be stored in the battery. Once the battery is cooled to approximately 10° C., the first switching valve 19 and the second switching valve 20 are switched to terminate the circulation of the coolant to the battery cooler 70 in the second coolant circuit.

For example, when the outside air temperature is 35° C., the coolant temperature in the first coolant circuit is at about 45° C., the coolant temperature in the second coolant circuit is at about 10° C., and the temperature of the engine coolant in the engine cooling circuit 40 is at about 20° C. In this case, the thermostat 48 closes the engine radiator flow path 46, whereby the engine coolant in the engine cooling circuit 40 does not flow through the engine radiator 47.

Figure 15:
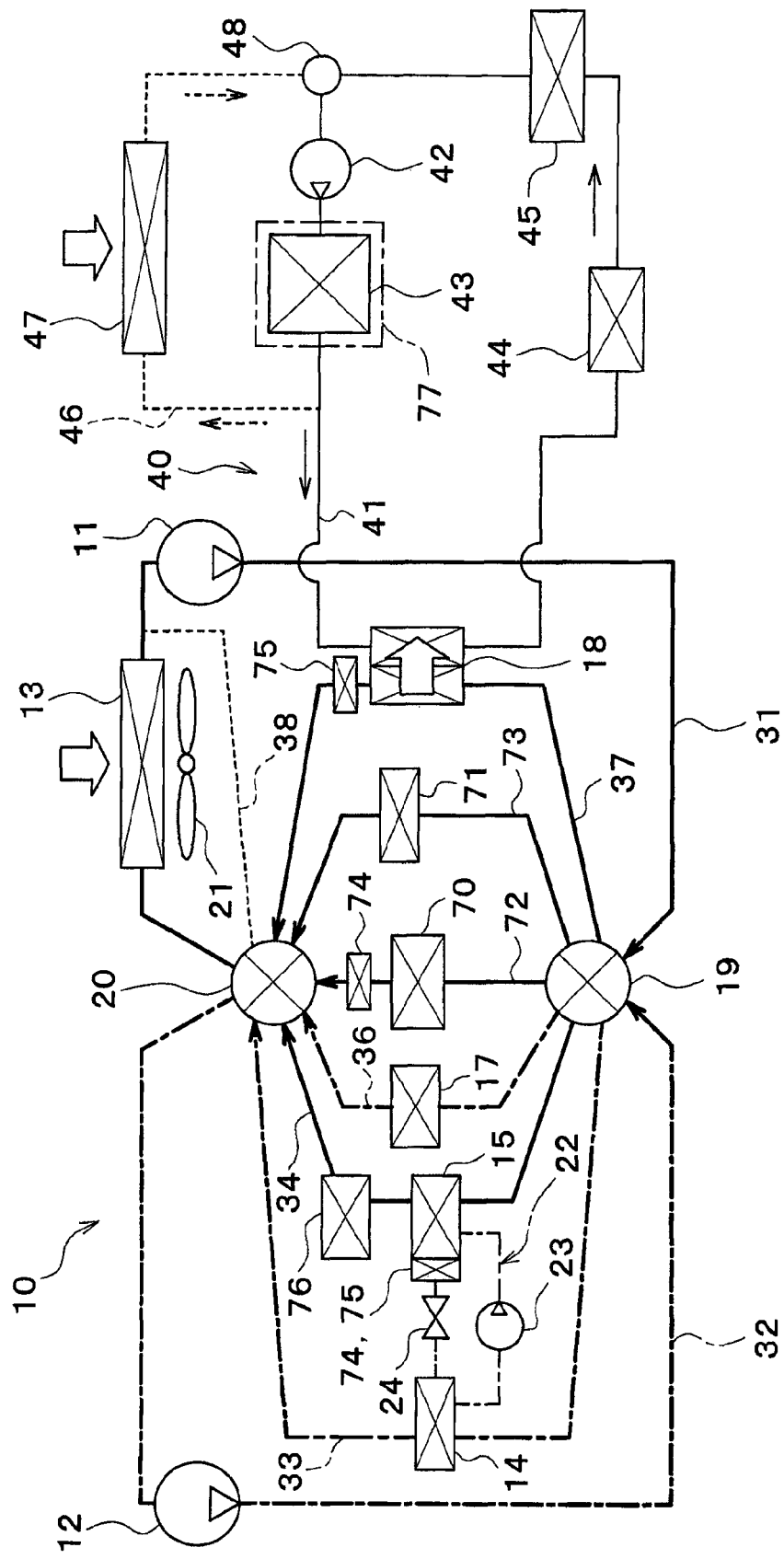
FIG. 15 is a diagram for explaining a fifth mode of the vehicle thermal management system in the second embodiment.

FIG. 15 shows the operation of the thermal management system 10 when the first and second switching valves 19 and 20 are switched to the fifth mode. The fifth mode is performed immediately after the fourth mode and after startup of the traveling electric motor, mainly in summer.

In the fifth mode, the first switching valve 19 and the second switching valve 20 connect the first-pump flow path 31 to the coolant-heater flow path 34, the battery cooler flow path 72, the inverter motor cooler flow path 73, and the coolant-coolant heat exchanger flow path 37, and also connect the second-pump flow path 32 to the coolant-cooler flow path 33 and the cooler-core flow path 36.

Thus, the first pump 11, the coolant heater 15, the sub-heater core 76, the battery cooler 70, the first supercooler 74, the inverter motor cooler 71, the coolant-coolant heat exchanger 18, the second supercooler 75, and the radiator 13 constitute a first coolant circuit (low-temperature coolant circuit), while the second pump 12, the coolant heater 14, and the cooler core 17 constitute a second coolant circuit (intermediate-temperature coolant circuit).

In the first coolant circuit, as indicated by thick solid arrows of FIG. 15, the coolant discharged from the first pump 11 flows through the coolant heater 15, the sub-heater core 76, the battery cooler 70, the first supercooler 74, the inverter motor cooler 71, the coolant-coolant heat exchanger 18, and the second supercooler 75 and then through the radiator 13 to be drawn into the first pump 11.

In the second coolant circuit, as indicated by thick alternate long and short dashed arrows of FIG. 15, the coolant discharged from the second pump 12 flows through the coolant cooler 14 and the cooler core 17 in parallel to be drawn into the second pump 12.

In the first coolant circuit, the coolant is cooled with cold heat stored in the battery at the battery cooler 70, and then the coolant cooled by the battery cooler 70 flows through the first supercooler 74. Thus, the coolant exchanges heat with the liquid-phase refrigerant condensed by the coolant heater 15 in the first supercooler 74 to absorb the heat. Thus, the first supercooler 74 supercools the liquid-phase refrigerant condensed by the coolant heater 15.

In the first coolant circuit, the coolant exchanges heat with the engine coolant in the engine cooling circuit 40 at the coolant-coolant heat exchanger 18 to dissipate heat therefrom. Accordingly, in the coolant-coolant heat exchanger 18, the coolant in the first coolant circuit is cooled with cold heat stored in the engine 43, and then the coolant cooled by the coolant-coolant heat exchanger 18 flows through the second supercooler 75. Thus, the coolant exchanges heat with the liquid-phase refrigerant condensed by the coolant heater 15 at the second supercooler 75 to absorb the heat. Thus, the second supercooler 75 supercools the liquid-phase refrigerant condensed by the coolant heater 15.

In the fifth mode, in the first supercooler 74, the liquid-phase refrigerant condensed by the coolant heater 15 is supercooled by the cold heat stored in the battery, and in the second supercooler 75, the liquid-phase refrigerant condensed by the coolant heater 15 is supercooled by the cold heat stored in the engine 43, so that the amount of circulation of the refrigerant in the refrigeration cycle 22 can be decreased to reduce the consumption power of the compressor 23.

For example, when the outside air temperature is 35° C., the coolant temperature in the first coolant circuit is at about 40° C., the coolant temperature in the second coolant circuit is at about 10° C., and the temperature of the engine coolant in the engine cooling circuit 40 is at about 10° C. In this case, the thermostat 48 closes the engine radiator flow path 46, whereby the engine coolant in the engine cooling circuit 40 does not flow through the engine radiator 47.

Like the first embodiment, in this embodiment, the devices 14, 15, 16, 17, 44, 70, 71, 74, 75, and 76 can be switched between the state of circulation of the coolant on the first pump 11 side and the state of circulation of the coolant on the second pump 12 side. Further, the heat can be exchanged between the devices 14, 15, 16, 17, 44, 70, 71, 74, 75, and 76 and the engine 43 via the coolant-coolant heat exchanger 18.

In this embodiment, the first switching valve 19 and the second switching valve 20 can implement an operation mode (for example, the first mode) in which the coolant on the side of one of the first and second pumps 11 and 12 circulates through the coolant cooler 14 and the radiator 13, and the coolant on a side of the other of the first and second pumps 11 and 12 circulates through the coolant heater 15 and the coolant-coolant heat exchanger 18.

Thus, the heat of the outside air is absorbed in the coolant at the radiator 13, and the heat of the coolant is dissipated into the engine coolant at the coolant-coolant heat exchanger 18, whereby the engine 43 can be heated by pumping up the heat of the outside air.

For example, when the battery is charged with power supplied from an external power source, the above operation mode is performed, so that the power supplied from the external power source can be used to pump up the heat from the outside air so as to store the hot heat in the engine 43.

In this embodiment, the first switching valve 19 and the second switching valve 20 can implement an operation mode (for example, the fourth mode) in which the coolant on a side of one of the first and second pumps 11 and 12 circulates through the coolant cooler 14 and the coolant-coolant heat exchanger 18, and the coolant on a side of the other of the first and second pumps 11 and 12 circulates through the coolant heater 15 and the coolant-outside air heat exchanger 13.

Thus, the heat of the engine coolant is absorbed in the coolant at the coolant-coolant heat exchanger 18, which can cool the engine 43 with the engine coolant whose heat is absorbed.

For example, when the battery is charged with the power supplied from the external power source, the above operation mode is performed, so that the power supplied from the external power source can be used to store the cold heat in the engine 43.

In this embodiment, the first switching valve 19 and the second switching valve 20 can implement an operation mode (for example, the second mode) of allowing the coolant on the side of one of the first and second pumps 11 and 12 to circulate through the heater core 76 and the coolant-coolant heat exchanger 18.

In this way, the hot heat stored in the engine 43 can be supplied to the heater core 76 via the coolant. Thus, the hot heat stored in the engine 43 can be used to heat the vehicle interior.

In this embodiment, the first switching valve 19 and the second switching valve 20 can implement an operation mode (for example, the fifth mode) of allowing the coolant on the side of one of the first and second pumps and 12 to circulate through the second supercooler 75 and the coolant-coolant heat exchanger 18.

In this way, the cold heat stored in the engine 43 can be supplied to the second supercooler 75 via the coolant. Thus, the cold heat stored in the engine 43 can be used to enhance the supercooling degree of the refrigerant.

In this embodiment, the first switching valve 19 and the second switching valve 20 can implement an operation mode (for example, the third mode) in which the coolant on the side of one of the first and second pumps 11 and 12 circulates through the coolant cooler 14 and the coolant-coolant heat exchanger 18, and the coolant on a side of the other of the first and second pumps 11 and 12 circulates through the coolant heater 15 and the heater core 76.

Thus, the heat of the engine coolant is absorbed in the coolant at the coolant-coolant heat exchanger 18, and the heat of the coolant is supplied to the heater core 76, which can heat the vehicle interior by pumping up the heat held in the engine 43.

In this embodiment, the coolant inlet 15*d* and the coolant outlet 15*b* of the coolant heater 15 are disposed between both ends of the coolant heater 15 in the lamination direction of the refrigerant tubes and the heat medium tubes. Thus, the coolant heater 15 does not allow the flow of coolant to make a U-turn.

Likewise, the coolant inlet 74*d* and the coolant outlet 74*b* of the first supercooler 74 are disposed between both ends of the first supercooler 74 in the lamination direction of the refrigerant tubes and the heat medium tubes. Thus, the first supercooler 74 does not allow the flow of coolant to make a U-turn.

Likewise, the coolant inlet 75*d* and the coolant outlet 75*b* of the second supercooler 75 are disposed between both ends of the second supercooler 75 in the lamination direction of the refrigerant tubes and the heat medium tubes. Thus, the second supercooler 75 does not allow the flow of coolant to make a U-turn.

(Third Embodiment)

Figure 16:
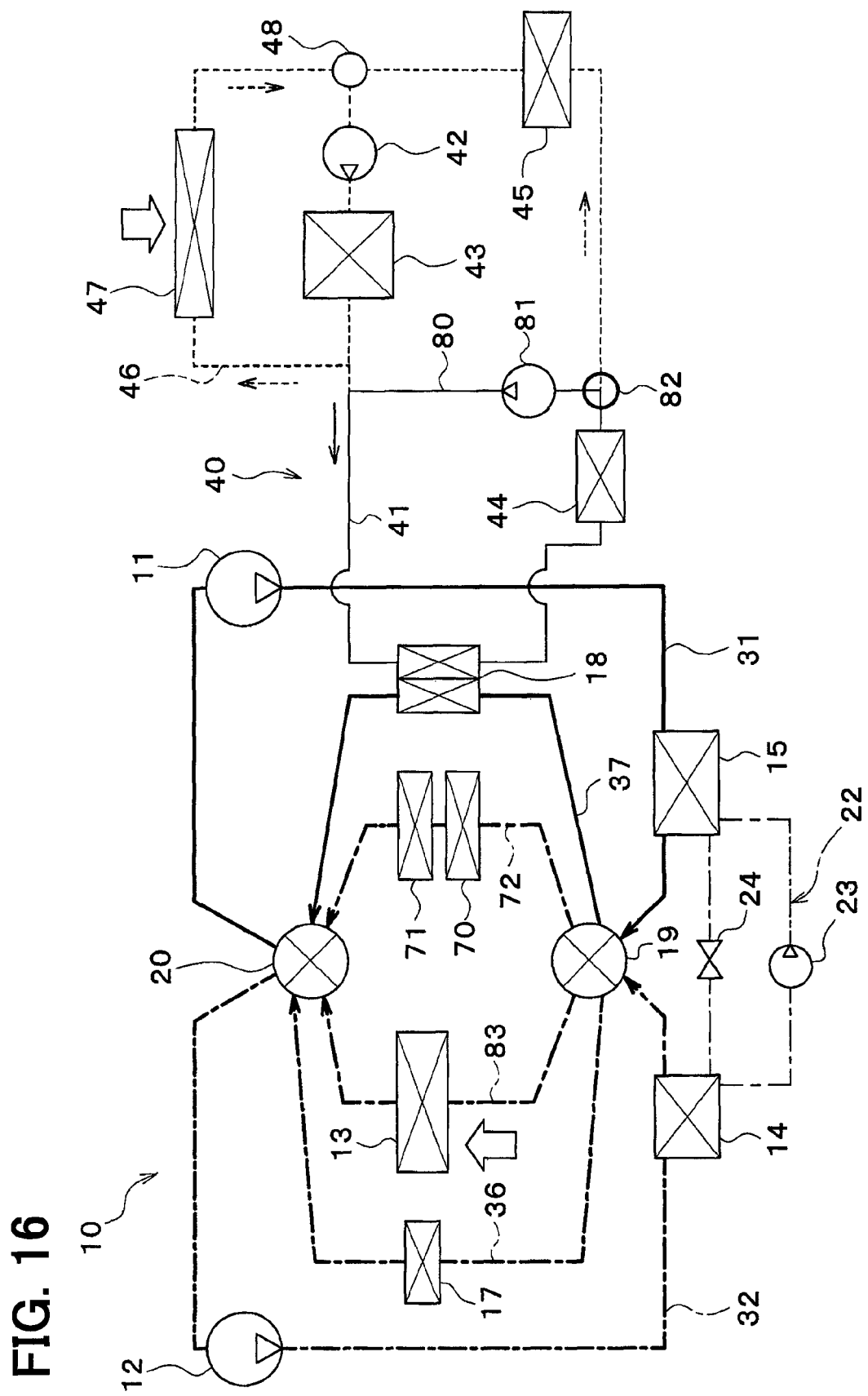
FIG. 16 is an entire configuration diagram of a vehicle thermal management system according to a third embodiment.

In the third embodiment, as shown in FIG. 16, with respect to the arrangement of the first embodiment, the arrangement of the radiator 13, the coolant cooler 14, and the coolant heater 15 is modified, and the battery cooler 70, the inverter motor cooler 71, an engine bypass flow path 80, an engine sub-pump 81, and a three-way valve 82 are added.

The radiator 13 is disposed in a radiator flow path 83. The coolant cooler 14 is disposed on the coolant discharge side of the second pump 12 in the second-pump flow path 32. The coolant heater 15 is disposed on the coolant discharge side of the first pump 11 in the first-pump flow path 31.

The battery cooler 70 is disposed in the battery cooler flow path 72. The inverter motor cooler 71 is disposed on the downstream side of the coolant flow of the battery cooler 70 in the battery cooler flow path 72.

The engine bypass flow path 80 is a flow path that allows the engine coolant flowing out of the coolant-coolant heat exchanger 18 and the heater core 44 to flow in the engine cooling circuit 40 while bypassing the CVT warmer 45 and the engine 43.

One end of the engine bypass flow path 80 is connected to a part between the heater core 44 and the CVT warmer 45 in the circulation flow path 41 of the engine cooling circuit 40. The other end of the engine bypass flow path 80 is connected to a part between the engine 43 and the coolant-coolant heat exchanger 18 in the circulation flow path 41 of the engine cooling circuit 40.

The engine sub-pump 81 is an electric pump that draws and discharges the engine coolant and is disposed in the engine bypass flow path 80. The engine sub-pump 81 is disposed in the engine bypass flow path 80 so as to draw the engine coolant flowing out of the heater core 44 and to discharge the drawn engine coolant toward the coolant-coolant heat exchanger 18.

The three-way valve 82 is a flow path switch adapted to switch between the circulation of the engine coolant through the circulation flow path 41 without flowing through the engine bypass flow path 80, and the circulation of the engine coolant through the engine bypass flow path 80 bypassing the CVT warmer 45 and the engine 43. The three way valve 82 is disposed at a connection part between the engine bypass flow path 80 and the circulation flow path 41.

The first switching valve 19 includes two inlets for the coolant, and four outlets for the coolant. The second switching valve 20 includes two outlets for the coolant, and four inlets for the coolant.

A first inlet of the first switching valve 19 is connected to one end of the first-pump flow path 31. In other words, the first inlet of the first switching valve 19 is connected to the coolant outlet side of the coolant heater 15.

A second inlet of the first switching valve 19 is connected to one end of the second-pump flow path 32. In other words, the second inlet of the first switching valve 19 is connected to the coolant outlet side of the coolant cooler 14.

A first outlet of the first switching valve 19 is connected to one end of the cooler-core flow path 36. In other words, the first outlet of the first switching valve 19 is connected to the coolant inlet side of the cooler core 17.

A second outlet of the first switching valve 19 is connected to one end of the radiator flow path 83. In other words, the second outlet of the first switching valve 19 is connected to the coolant inlet side of the radiator 13. A third outlet of the first switching valve 19 is connected to the coolant inlet side of the battery cooler 70.

A fourth outlet of the first switching valve 19 is connected to one end of the coolant-coolant heat exchanger flow path 37. In other words, the fourth outlet of the first switching valve 19 is connected to the coolant inlet side of the coolant-coolant heat exchanger 18.

A first outlet of the second switching valve 20 is connected to the other end of the first-pump flow path 31. In other words, the first outlet of the second switching valve 20 is connected to the coolant suction side of the first pump 11.

A second outlet of the second switching valve 20 is connected to the other end of the second-pump flow path 32. In other words, the second outlet of the second switching valve 20 is connected to the coolant suction side of the second pump 12.

A first inlet of the second switching valve 20 is connected to the other end of the cooler-core flow path 36. In other words, the first inlet of the second switching valve 20 is connected to the coolant outlet side of the cooler core 17.

A second inlet of the second switching valve 20 is connected to the other end of the radiator flow path 83. In other words, the second outlet of the second switching valve 20 is connected to the coolant outlet side of the radiator 13.

A third inlet of the second switching valve 20 is connected to the other end of the battery cooler flow path 72. In other words, the third inlet of the second switching valve 20 is connected to the coolant outlet side of the inverter motor cooler 71.

A fourth inlet of the second switching valve 20 is connected to the other end of the coolant-coolant heat exchanger flow path 37. In other words, the fourth inlet of the second switching valve 20 is connected to the coolant outlet side of the coolant-coolant heat exchanger 18.

The first switching valve 19 can be configured to arbitrarily or selectively switch the communication states between the two inlets and the four outlets. The second switching valve 20 can also be configured to arbitrarily or selectively switch the communication states between the two outlets and the four inlets.

FIG. 16 shows the operation of the thermal management system 10 when the first and second switching valves 19 and 20 are switched to the first mode. The first mode is performed mainly in winter during stopping of the engine 43.

In the first mode, the first switching valve 19 and the second switching valve 20 connect the first-pump flow path 31 to the coolant-coolant heat exchanger flow path 37 and also connect the second-pump flow path 32 to the cooler core flow path 36, the radiator flow path 83, and the battery cooler flow path 72.

In the first mode, the three-way valve 82 switches to a flow path such that the engine coolant flowing out of the coolant-coolant heat exchanger 18 and the heater core 44 flows through the engine bypass flow path 80 while bypassing the CVT warmer 45 and the engine 43.

Accordingly, the first pump 11, the coolant heater 15, and the coolant-coolant heat exchanger 18 constitute the first coolant circuit (intermediate-temperature coolant circuit), whereas the second pump 12, the coolant cooler 14, the cooler core 17, the radiator 13, the battery cooler 70, and the inverter motor cooler 71 constitute the second coolant circuit (low-temperature coolant circuit).

In the first coolant circuit, as indicated by thick solid arrows of FIG. 16, the coolant discharged from the first pump 11 flows through the coolant heater 15 and then through the coolant-coolant heat exchanger 18 to be drawn into the first pump 11.

In the second coolant circuit, as indicated by thick alternate long and short dashed arrows of FIG. 16, the coolant discharged from the second pump 12 flows through the coolant cooler 14 and then through the cooler core 17, the radiator 13, the battery cooler 70, and the inverter motor cooler 71 to be drawn into the second pump 12.

In the engine cooling circuit 40, as indicated by thick solid arrows of FIG. 16, the coolant discharged from the engine sub-pump 81 flows through the coolant-coolant heat exchanger 18 and the heater core 44 in series to be drawn into the engine sub-pump 81.

In the second coolant circuit, the low-temperature coolant cooled by the coolant cooler 14 flows through the radiator 13, allowing the coolant to absorb heat from the outside air in the radiator 13. Then, the coolant absorbing heat from the outside air in the radiator 13 exchanges heat with the refrigerant in the refrigeration cycle 22 at the coolant cooler 14 to dissipate heat therefrom. Thus, in the coolant cooler 14, the refrigerant in the refrigeration cycle 22 absorbs heat from outside air via the coolant.

The refrigerant absorbing heat from the outside air in the coolant cooler 14 exchanges heat with the coolant in the first coolant circuit at the coolant heater 15, thereby heating the coolant in the first coolant circuit. That is, the heat pump operation of pumping up heat from the outside air to the coolant in the first coolant circuit can be achieved.

The coolant heated by the coolant heater 15 exchanges heat with the engine coolant in the engine cooling circuit 40 when flowing through the coolant-coolant heat exchanger 18, thus dissipating heat therefrom. Thus, in the coolant-coolant heat exchanger 18, the engine coolant of the engine cooling circuit 40 can be heated.

The engine coolant in the engine cooling circuit 40 heated by the coolant-coolant heat exchanger 18 exchanges air to be blown into the vehicle interior when flowing through the heater core 44 to thereby dissipate heat therefrom into the air. Thus, the heater core 44 heats the air to be blown into the vehicle interior, thereby enabling heating of the vehicle interior.

Since the coolant does not flow through the engine 43 and the CVT warmer 45 in the engine cooling circuit 40, the heat of the coolant in the first coolant circuit can be effectively used for heat exchange with the heater core 44, thereby improving the heating performance.

(Fourth Embodiment)

Figure 17:
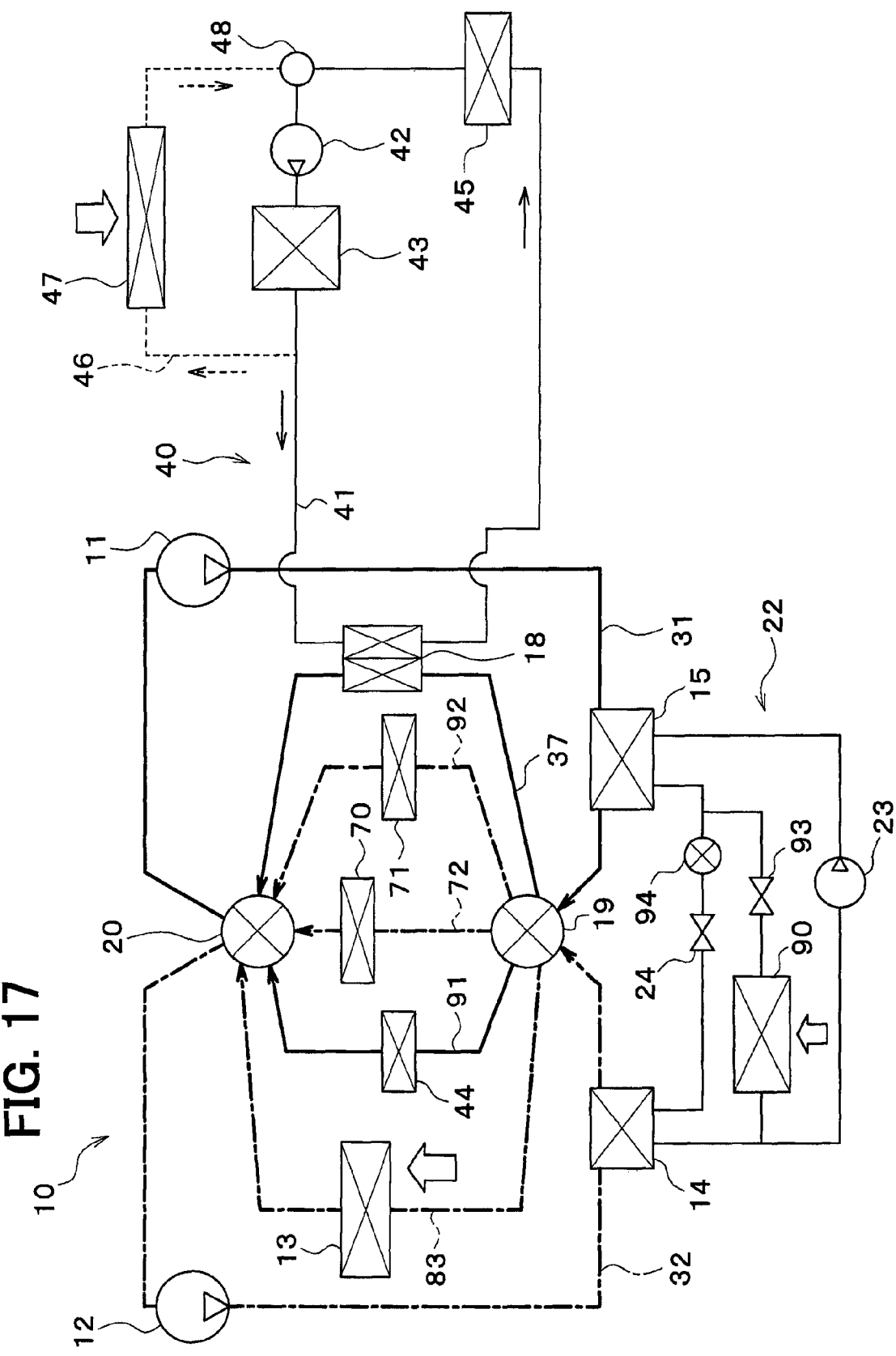
FIG. 17 is an entire configuration diagram of a vehicle thermal management system according to a fourth embodiment.

In a fourth embodiment, as shown in FIG. 17, with respect to the arrangement of the third embodiment, the arrangement of the heater core 44 and the inverter motor cooler 71 is modified, and instead of the cooler core 17, an evaporator 90 is added.

The heater core 44 is disposed in a heater core flow path 91. The inverter motor cooler 71 is disposed in an inverter motor cooler flow path 92.

The refrigeration cycle 22 includes an evaporator expansion valve 93 and an electromagnetic valve 94. The evaporator expansion valve 93 and the evaporator 90 are arranged in parallel with the expansion valve 24 and the coolant cooler 14 in the refrigeration cycle 22.

The electromagnetic valve 94 opens and closes a refrigerant flow path leading from the coolant heater 15 to the expansion valve 24. Thus, the electromagnetic valve 94 discontinuously switches the circulation of the refrigerant through the expansion valve 24 and the coolant cooler 14.

Although not shown, the evaporator 90 is disposed on the upstream side of the air flow in the heater core 44 within the casing 51.

The first switching valve 19 includes two inlets for the coolant, and five outlets for the coolant. The second switching valve 20 includes two outlets for the coolant, and five inlets for the coolant.

A first inlet of the first switching valve 19 is connected to one end of the first-pump flow path 31. In other words, the first inlet of the first switching valve 19 is connected to the coolant outlet side of the coolant heater 15.

A second inlet of the first switching valve 19 is connected to one end of the second-pump flow path 32. In other words, the second inlet of the first switching valve 19 is connected to the coolant outlet side of the coolant cooler 14.

A first outlet of the first switching valve 19 is connected to one end of the radiator flow path 83. In other words, the first outlet of the first switching valve 19 is connected to the coolant inlet side of the radiator 13.

A second outlet of the first switching valve 19 is connected to one end of the heater core flow path 91. In other words, the second outlet of the first switching valve 19 is connected to the coolant inlet side of the heater core 44.

A third outlet of the first switching valve 19 is connected to one end of the battery cooler flow path 72. In other words, the third outlet of the first switching valve 19 is connected to the coolant inlet side of the battery cooler 70.

A fourth outlet of the first switching valve 19 is connected to one end of the inverter motor cooler flow path 92. In other words, the fourth outlet of the first switching valve 19 is connected to the coolant inlet side of the inverter motor cooler 71.

A fifth outlet of the first switching valve 19 is connected to one end of the coolant-coolant heat exchanger flow path 37. In other words, the fifth outlet of the first switching valve 19 is connected to the coolant inlet side of the coolant-coolant heat exchanger 18.

A first outlet of the second switching valve 20 is connected to the other end of the first-pump flow path 31. In other words, the first outlet of the second switching valve 20 is connected to the coolant suction side of the first pump 11.

A second outlet of the second switching valve 20 is connected to the other end of the second-pump flow path 32. In other words, the second outlet of the second switching valve 20 is connected to the coolant suction side of the second pump 12.

A first inlet of the second switching valve 20 is connected to the other end of the radiator flow path 83. In other words, the first inlet of the second switching valve 20 is connected to the coolant outlet side of the radiator 13.

A second inlet of the second switching valve 20 is connected to the other end of the heater core flow path 91. In other words, the second inlet of the second switching valve 20 is connected to the coolant outlet side of the heater core 44.

A third inlet of the second switching valve 20 is connected to the other end of the battery cooler flow path 72. In other words, the third inlet of the second switching valve 20 is connected to the coolant outlet side of the battery cooler 70.

A fourth inlet of the second switching valve 20 is connected to the other end of the inverter motor cooler flow path 92. In other words, the fourth inlet of the second switching valve 20 is connected to the coolant outlet side of the inverter motor cooler 71.

A fifth inlet of the second switching valve 20 is connected to the other end of the coolant-coolant heat exchanger flow path 37. In other words, the fifth inlet of the second switching valve 20 is connected to the coolant outlet side of the coolant-coolant heat exchanger 18.

The first switching valve 19 can be configured to arbitrarily or selectively switch the communication states between the two inlets and the five outlets. The second switching valve 20 can also be configured to arbitrarily or selectively switch the communication states between the two outlets and the five inlets.

FIG. 17 shows the operation of the thermal management system 10 when the first and second switching valves 19 and 20 are switched to the first mode. The first mode is performed mainly in winter during stopping of the engine 43.

In the first mode, the first switching valve 19 and the second switching valve 20 connect the first-pump flow path 31 to the heater core flow path 91 and the coolant-coolant heat exchanger flow path 37 and also connect the second-pump flow path 32 to the radiator flow path 83, the battery cooler flow path 72, and the inverter motor cooler flow path 92.

Accordingly, the first pump 11, the coolant heater 15, the heater core 44, and the coolant-coolant heat exchanger 18 constitute the first coolant circuit (intermediate-temperature coolant circuit), whereas the second pump 12, the coolant cooler 14, the radiator 13, the battery cooler 70, and the inverter motor cooler 71 constitute the second coolant circuit (low-temperature coolant circuit).

In the first coolant circuit, as indicated by thick solid arrows of FIG. 17, the coolant discharged from the first pump 11 flows through the coolant heater 15 and then through the heater core 44 and the coolant-coolant heat exchanger 18 to be drawn into the first pump 11.

In the second coolant circuit, as indicated by thick alternate long and short dashed arrows of FIG. 17, the coolant discharged from the second pump 12 flows through the coolant cooler 14 and then through the radiator 13, the battery cooler 70, and the inverter motor cooler 71 to be drawn into the second pump 12.

In the second coolant circuit, the low-temperature coolant cooled by the coolant cooler 14 flows through the radiator 13, allowing the coolant to absorb heat from the outside air in the radiator 13. Then, the coolant absorbing heat from the outside air in the radiator 13 exchanges heat with the refrigerant in the refrigeration cycle 22 at the coolant cooler 14 to dissipate heat therefrom. Thus, in the coolant cooler 14, the refrigerant in the refrigeration cycle 22 absorbs heat from outside air via the coolant.

The refrigerant absorbing heat from the outside air in the coolant cooler 14 exchanges heat with the coolant in the first coolant circuit at the coolant heater 15, thereby heating the coolant in the first coolant circuit. That is, the heat pump operation of pumping up heat from the outside air to the coolant in the first coolant circuit can be achieved.

The coolant heated by the coolant heater 15 exchanges heat with the air to be blown into the vehicle interior in flowing through the heater core 44, thereby dissipating heat therefrom. Thus, the heater core 44 heats the air to be blown into the vehicle interior, thereby enabling heating of the vehicle interior.

Further, the coolant heated by the coolant heater 15 exchanges heat with the engine coolant in the engine cooling circuit 40 when flowing through the coolant-coolant heat exchanger 18, thus dissipating heat therefrom. Thus, in the coolant-coolant heat exchanger 18, the engine coolant of the engine cooling circuit 40 can be heated.

The engine coolant in the engine cooling circuit 40 heated by the coolant-coolant heat exchanger 18 flows through the CVT warmer 45 and the engine 43, thereby enabling warm-up of the engine 43 while warming the CVT oil.

In the evaporator 90, the low-pressure side refrigerant of the refrigeration cycle 22 exchanges heat with the air to be blown into the vehicle interior, thereby cooling the air into the vehicle interior. Accordingly, the vehicle interior can be cooled.

(Other Embodiments)

The above-mentioned other embodiments can be appropriately combined together. Various modifications and changes can be made to the above-mentioned embodiments as follows.

(1) Various devices can be used as temperature adjustment target devices (device to be cooled/device to be heated) whose temperature is adjusted (cooled/heated) by the coolant.

For example, the temperature adjustment target device may be a heat exchanger incorporated in a seat where a passenger sits and designed to cool or heat the seat by the coolant. An exhaust gas cooler that cools exhaust gas from an engine with a coolant may be used as the temperature adjustment target device.

The number of temperature adjustment target devices may be appropriately changed.

(2) In the embodiments described above, the coolant cooler 14 that cools the coolant with the low-pressure refrigerant in the refrigeration cycle 22 is used as the cooler for cooling the coolant down to a lower temperature than the outside air temperature. However, a Peltier device may be used as the cooler.

(3) In each of the above-mentioned embodiments, the coolant is used as the heat medium (first heat medium) that adjusts the temperature of the temperature adjustment target device (device to be cooled/device to be heated). Alternatively, various media, such as oil, may be used as the heat medium.

Nano-fluid may be used as the heat medium. The nano-fluid is a fluid into which nanoparticles with a particle diameter of the order of nanometer are mixed. Mixing of the nanoparticles into the heat medium can have the following effects, in addition to the same effect of decreasing a freezing point as that in use of a coolant using ethylene glycol (so-called antifreeze solution).

That is, the above-mentioned effects can include improving a thermal conductivity in a specific temperature range, increasing a heat capacity of the heat medium, preventing corrosion of a metal pipe and degradation of a rubber tube, and enhancing a fluidity of the heat medium at an ultralow temperature.

These effects vary depending on the composition, shape, and compounding ratio of nanoparticles, and additives.

With this arrangement, the thermal conductivity can be improved, and thus can obtain the same cooling efficiency, even though the above heat medium containing the nanoparticles is used in a small amount as compared to a coolant using ethylene glycol.

The thermal capacity of the heat medium can be increased to thereby increase the amount of the cold heat stored in the heat medium itself (cold heat stored due to sensible heat).

Since the amount of stored cold heat is increased, even though the compressor 23 does not operate, the temperature of the device in the thermal management system can be adjusted, specifically, by cooling or heating the device with the stored cold heat for a while, which can save the power of the vehicle thermal management system.

An aspect ratio of a nanoparticle is preferably equal to or more than 50. This is because sufficient heat conductivity can be obtained. The term "aspect ratio" as used herein means a shape index indicative of a ratio between the longitudinal and lateral dimensions of the nanoparticle.

Nanoparticles can include any one of Au, Ag, Cu, and C. Specifically, as atoms of the nanoparticles, an Au nanoparticle, a Ag nanowire, a CNT (carbon nanotube), a graphene, a graphite core shell type nano particle (grain body having a structure surrounding the above-mentioned atom, such as a carbonnanotube), an Au nanoparticle-containing CNT can be used.

(4) The refrigeration cycle 22 in each of the above embodiments employs a fluorocarbon refrigerant as the refrigerant. However, the kind of the refrigerant is not limited to such a kind of refrigerant. Specifically, a natural refrigerant, such as carbon dioxide, a hydrocarbon-based refrigerant, and the like may also be used as the refrigerant.

The refrigeration cycle 22 in each of the above embodiments forms a subcritical refrigeration cycle whose high-pressure side refrigerant pressure does not exceed a critical pressure of the refrigerant. Alternatively, the refrigeration cycle 22 may form a supercritical refrigeration cycle whose high-pressure side refrigerant pressure exceeds the critical pressure of the refrigerant.

(5) Although in the above second embodiment, the cold heat stored in the engine 43 and the battery is used to supercool the high-pressure refrigerant of the refrigeration cycle 22 in the fifth mode, the cold heat stored in the engine 43 and the battery may be used to cool the air of the vehicle interior, the inverter, and the like.

(6) Although in the second embodiment, the heat/cold storage is performed in the battery via the battery cooler 70, a device designed to perform the heat/cold storage may be disposed in parallel with the battery cooler 70. In this case, a supercooler is disposed downstream of the coolant flow of the device for performing the heat/cold storage, whereby the stored cold heat can be recovered.

Suitable cold storage agents or heat storage agents used in the device that performs heat/cold storage can include, for example, paraffin, sodium acetate hydrate, and the like.

(7) Although the respective embodiments show the examples in which the vehicle thermal management system 10 is applied to a hybrid vehicle, the vehicle thermal management system 10 may be applied to any other vehicle that obtains a driving force for traveling from an engine even without an electric motor for traveling.

What is claimed is:

1. A thermal management system for a vehicle, comprising:
    a first pump and a second pump, which are adapted to draw and discharge a first heat medium;
    a first heat exchanger that exchanges heat between outside air and the first heat medium discharged from the first pump or the second pump;
    a plurality of devices in which the first heat medium circulates;
    an engine cooling circuit allowing a second heat medium to circulate through an engine;
    an engine pump adapted to draw and discharge the second heat medium;
    a second heat exchanger that exchanges heat between the first heat medium and the second heat medium;
    a first switching valve adapted to switch a flow of the first heat medium, the first switching valve being disposed in a flow path in which a heat medium discharge side of the first pump and a heat medium discharge side of the second pump are connected in parallel with each other, and the plurality of devices and the second heat exchanger are connected in parallel with each other; and
    a second switching valve adapted to switch a flow of the first heat medium, the second switching valve being disposed in another flow path in which a heat medium suction side of the first pump and a heat medium suction side of the second pump are connected in parallel with each other, and the plurality of devices and the second heat exchanger are connected in parallel with each other, wherein
    the first switching valve switches between a state in which the first heat medium discharged from the first pump flows, and another state in which the first heat medium discharged from the second pump flows, with respect to the plurality of devices and the second heat exchanger, and
    the second switching valve switches between a state in which the first heat medium flows into the first pump, and another state in which the first heat medium flows into the second pump, with respect to the plurality of devices and the second heat exchanger.

2. The thermal management system for a vehicle according to claim 1, wherein
    the plurality of devices includes a heat medium cooler adapted to cool the first heat medium by exchanging heat between a low-pressure side refrigerant of a refrigeration cycle and the first heat medium, and a heat medium heater adapted to heat the first heat medium by exchanging heat between a high-pressure side refrigerant of the refrigeration cycle and the first heat medium, and
    the first switching valve and the second switching valve are capable of implementing an operation mode in which the first heat medium on a side of one of the first pump and the second pump circulates through the heat medium cooler and the first heat exchanger, and the first heat medium on a side of the other of the first pump and the second pump circulates through the heat medium heater and the second heat exchanger.

3. The thermal management system for a vehicle according to claim 2, further comprising
a controller that controls operation of the first switching valve and the second switching valve to perform the operation mode, when a temperature of the second heat medium is determined to be less than a predetermined temperature.

4. The thermal management system for a vehicle according to claim 2 being used in a vehicle capable of charging a battery with power supplied from an external power source, the thermal management system comprising:
a compressor driven by power supplied from the battery and adapted to draw and discharge a refrigerant in the refrigeration cycle; and
a controller that controls operation of the first switching valve and the second switching valve to perform the operation mode, when the battery is charged with power supplied from the external power source.

5. The thermal management system for a vehicle according to claim 1, wherein
the plurality of devices includes a heat medium cooler adapted to cool the first heat medium by exchanging heat between a low-pressure side refrigerant of a refrigeration cycle and the first heat medium, and a heat medium heater adapted to heat the first heat medium by exchanging heat between a high-pressure side refrigerant of the refrigeration cycle and the first heat medium, and
the first switching valve and the second switching valve are capable of implementing an operation mode in which the first heat medium on a side of one of the first pump and the second pump circulates through the heat medium cooler and the second heat exchanger, and the first heat medium on a side of the other of the first pump and the second pump circulates through the heat medium heater and the first heat exchanger.

6. The thermal management system for a vehicle according to claim 1, wherein
the first switching valve and the second switching valve are capable of implementing an operation mode in which the first heat medium on a side of one of the first pump and the second pump circulates through the first heat exchanger and the second heat exchanger.

7. The thermal management system for a vehicle according to claim 1, wherein
the plurality of devices includes a temperature adjustment target device in which temperature is adjusted by the first heat medium, and
the first switching valve and the second switching valve are capable of implementing an operation mode in which the first heat medium on a side of one of the first pump and the second pump circulates through the temperature adjustment target device and the second heat exchanger.

8. The thermal management system for a vehicle according to claim 1, further comprising
a third heat exchanger adapted to exchange heat between the second heat medium and outside air, wherein
the plurality of devices includes a heat medium heater that heats the first heat medium by exchanging heat between a high-pressure side refrigerant of a refrigeration cycle and the first heat medium, and
the first switching valve and the second switching valve are capable of implementing an operation mode in which the first heat medium on a side of one of the first pump and the second pump circulates through the heat medium heater, the first heat exchanger, and the second heat exchanger.

9. The thermal management system for a vehicle according to claim 1, wherein
the plurality of devices includes:
a heat medium cooler that cools the first heat medium by exchanging heat between a low-pressure side refrigerant of a refrigeration cycle and the first heat medium,
a heat medium heater that heats the first heat medium by exchanging heat between a high-pressure side refrigerant of the refrigeration cycle and the first heat medium, and
a temperature adjustment target device in which temperature is adjusted by the first heat medium, wherein
the first switching valve and the second switching valve are capable of implementing an operation mode in which the first heat medium on a side of one of the first pump and the second pump circulates through the heat medium cooler and the second heat exchanger, and the first heat medium on a side of the other of the first pump and the second pump circulates through the heat medium heater and the temperature adjustment target device.

10. The thermal management system for a vehicle according to claim 1, wherein
the plurality of devices includes a refrigerant-heat medium heat exchanger that exchanges heat between the refrigerant flowing out of the heat medium heater and the first heat medium,
each of the heat medium heater and the refrigerant-heat medium heat exchanger is configured by laminating a plurality of refrigerant tubes for circulation of the refrigerant and a plurality of heat medium tubes for circulation of the first heat medium,
a heat medium inlet and a heat medium outlet of the heat medium heater are disposed between both ends of the heat medium heater in a lamination direction of the refrigerant tubes and the heat medium tubes, and
a heat medium inlet and a heat medium outlet of the refrigerant-heat medium heat exchanger are disposed between both ends of the refrigerant-heat medium heat exchanger in the lamination direction of the refrigerant tubes and the heat medium tubes.

* * * * *